(12) United States Patent
Auschra et al.

(10) Patent No.: US 6,849,679 B2
(45) Date of Patent: Feb. 1, 2005

(54) PIGMENT COMPOSITIONS WITH MODIFIED BLOCK COPOLYMER DISPERSANTS

(75) Inventors: Clemens Auschra, Freiburg (DE); Ernst Eckstein, Rheinfelden (DE); Marie-Odile Zink, Steinbach (FR); Andreas Mühlebach, Frick (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 78 days.

(21) Appl. No.: 10/128,836

(22) Filed: Apr. 23, 2002

(65) Prior Publication Data

US 2003/0105201 A1 Jun. 5, 2003

(30) Foreign Application Priority Data

May 21, 2001 (EP) .............................. 01810504

(51) Int. Cl.[7] ................................. C08K 3/00

(52) U.S. Cl. .................. 524/438; 524/432; 524/431
(58) Field of Search ................. 524/438, 432, 524/431

(56) References Cited

FOREIGN PATENT DOCUMENTS

| | | | |
|---|---|---|---|
| GB | 2335190 | | 9/1999 |
| WO | 98/30601 | | 7/1998 |
| WO | 00/18807 | | 4/2000 |
| WO | 00/40630 | | 7/2000 |
| WO | WO 00/40630 | * | 7/2000 |

* cited by examiner

Primary Examiner—Ling-Siu Choi
(74) Attorney, Agent, or Firm—Shiela A. Loggins

(57) ABSTRACT

The present invention relates to a composition containing modified block copolymer dispersants and dispersible inorganic or organic pigments. The block copolymers are modified with a salt forming group. The pigment composition is useful for preparing coating compositions, prints, images, inks or lacquers and other disperse systems.

20 Claims, No Drawings

PIGMENT COMPOSITIONS WITH MODIFIED BLOCK COPOLYMER DISPERSANTS

The present invention relates to a composition containing modified block copolymer dispersants and dispersible inorganic or organic pigment particles, a process for preparing the composition, a pigment dispersion containing modified block copolymer dispersants and dispersible inorganic or organic pigment particles, a process for preparing the pigment dispersion and to the use of the pigment dispersion for preparing coatings, images, lacquers and others.

Dispersions containing pigments and polymer additives are used in an almost unlimited number of different technical applications, e.g. as coating materials, for printing inks, colouring plastic materials, including fibres, glasses, or ceramic products, for formulations in cosmetics, or for the preparation of paint systems, in particular automotive, industrial and decorative paints.

The function of polymers in pigment dispersions is manifold. They may act as solubilisers in the given carrier liquid, e.g. water or organic solvents. Suitable polymers are also needed as stabilisers to prevent precipitation or flocculation. Polymers may also improve the gloss of the pigment dispersion or enhance its rheology. Depending on the type and polarity of the dispersing agent, e.g. water, organic solvents or mixtures thereof, polymers of variable structure are chosen. In view of ecological requirements, the use of aqueous pigment dispersions is particularly preferred, as well as dispersions based on organic solvents with high solids content. In aqueous systems, mixtures of hydrophobic and hydrophilic polymers or block copolymers, so-called A-B block copolymers, containing hydrophilic and hydrophobic polymer blocks are present. The hydrophobic "A" blocks (homo- or copolymers of methacrylate monomers) associate with either pigment or emulsion polymer surfaces or both. With hydrophilic "B" blocks (neutralised acid or amine containing polymers), these copolymers are useful for preparing water based pigment dispersions, cf. H. J. Spinelli, *Progress in Organic Coatings* 27 (1996), 255–260.

Many different well-established methods are available for preparing the polymers used in pigment dispersions. Most methods have the disadvantage that uncontrollable recombination reactions of initiator radicals may occur immediately after their formation with the effect that variable ratios between initiator radicals and stable free radicals are produced. Consequently, in some cases there is an inefficient control of the polymerisation process.

Group transfer polymerisation (GTP) is a well-established method for producing A-B block copolymers of defined structure from methacrylate monomers. Despite its wide applicability and usefulness the GTP method still has several drawbacks. The polymerisation initiators used in this method, such as the silyl ketene acetals disclosed in U.S. Pat. No. 4,656,226, e.g. 1-trimethylsilyloxy-1-isobutoxy-2-methylpropene, are highly reactive and difficult to prepare in a multi-step synthesis. This necessitates the use of carefully dried and purified reactants, which limits this method in industrial applications operating on a large scale.

WO 96/30421 discloses a controlled or "living" polymerisation process of ethylenically unsaturated polymers, such as styrene or (meth)acrylates, by employing the Atomic Transfer Radical Polymerisation (ATRP) method. This method produces defined oligomeric homopolymers and copolymers, including block copolymers. Initiators are employed, which generate radical atoms, such as .Cl, in the presence of a redox system of transition metals of different oxidation states, e.g. Cu(I) and Cu(II), providing "living" or controlled radical polymerisation.

A general drawback of this prior art method is seen in the fact that the polymer chains prepared by ATRP contain halogen as terminal fragment, which has been transferred from the polymerisation initiator. The content of halogen is generally undesirable in polymers. Halogen, especially chlorine and bromine, is subject to the removal as hydrogen halide depending on temperature, especially above 150° C. The double bond thus formed is subject to a reaction with atmospheric oxygen, which decreases the antioxidative resistance of the polymer. Moreover, hydrogen halide liberated from the polymer reacts with other functional groups present in the polymer, such as ester groups present in acrylates. Depending on the type of the polymer, chlorine is also removed in the form of a radical, which might initiate undesirable chain reactions in the polymer structure. The removal of halogen from the polymer structure, especially from the terminal position of the polymer chain, and its replacement with suitable substituents in a subsequent process step is described in WO 00/18807.

U.S. Pat. No. 4,581,429 discloses a free radical polymerisation process by the controlled or "living" growth of polymer chains. A specific process embodiment is the use of initiators of the partial formula R'R"N—O—X. In the polymerisation process the free radical species R'R"N—O. and .X are generated. .X is a free radical group, e.g. a tert-butyl or cyanoisopropyl radical, capable of polymerising monomer units containing ethylene groups. The monomer units A are substituted by the initiator fragments R'R"N—O. and .X and polymerise to structures of the type: R'R"N—O—A—X (A: polymer block). Specific R'R"N—O—X initiators mentioned are derived from cyclic structures, such as 2,2,6,6-tetramethylpiperidine, or open chain molecules, such as di-tert-butylamine.

Recently some alternative polymerisation regulators have been published. WO 98/30601 discloses heterocyclic >N—O—R compounds suitable for controlled polymerisation processes. WO 98/13392 discloses open chain alkoxyamines, which are derived from NO-gas or from nitroso compounds. The advantage of these prior art polymerisation methods over the ATRP-method is seen in the fact that no subsequent replacement of terminal groups of the polymer chains is needed.

In view of the almost unlimited range of different technical applications, there remains a growing need for pigment dispersions of improved pigment affinity and rheology, as expressed by the viscosity of the mill base at a given shear rate and improved gloss of surface coatings.

A prior art solution to this problem is disclosed in WO 00/40630, wherein pigment dispersions are disclosed containing block copolymers as dispersants, prepared by the ATRP-method. The block copolymers consist of defined hydrophobic and hydrophilic polymer blocks. The difference in polarity is obtained by copolymerising polymer blocks A and B wherein different amounts of monomer units with hydrophilic functional groups are present, such as amino or alkylated amino groups. This changes the hydrophilic/hydrophobic character of the block copolymer dispersant. In one embodiment, the individual hydrophobic "A" blocks based on uncharged homo- or copolymers of methacrylate monomers form steric stabiliser blocks in solvent based coating formulations. The presence of more hydrophilic "B" blocks (e.g. amino functional acrylates or methacrylates) is the basis for pigment affinity to certain organic or inorganic pigments.

It has surprisingly been found that the addition of salt forming components, such as mono-, bi- or tricyclic sulphonic, carboxylic and phosphonic acids, in the event that monomer units containing amino groups are present in the hydrophilic polymer blocks, produces pigment dispersions having improved properties for the above-mentioned technical applications.

The present invention relates to a composition comprising a) 0.1–99.9% by weight of a combination of dispersing agents essentially consisting of
i) A block copolymer of the formula

wherein
X and Y represent chain terminal groups from fragments of a polymerisation initiator containing the group

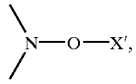

wherein
X' is cleavable from the initiator as a free radical X. and is capable of initiating the polymerisation of ethylenically unsaturated monomers; or
one of X and Y represents the fragment of a free radical initiator and the other one represents the chain terminal group from the free nitroxyl radical

A and B represent different polymer blocks composed of non-ionic repeating units of ethylenically unsaturated monomers, wherein one of the polymer blocks A or B additionally contains repeating units of ethylenically unsaturated monomers substituted with ionic groups;
x and y represent numerals greater than zero and define the number of monomer repeating units in polymer blocks A and B; and
(ii) A salt forming component; and
b) 0.1–99.9% by weight of dispersible inorganic or organic pigment particles.

The present invention also relates to a pigment dispersion comprising a dispersed phase consisting of
a') A block copolymer of the formula I, wherein X, A, B, Y, x and y are as defined above; and
b') Dispersed pigment particles; and
An organic or aqueous carrier liquid, e.g. a liquid carrier selected from the group consisting of water, organic solvents and mixtures thereof.

The pigment dispersions are useful for a variety of uses, e.g. for the preparation of inks or printing inks in printing processes, such as flexographics, screen, packaging, security ink, intaglio or offset printing, for pre-press stages and textile printing, for office, home or graphic applications, for paper goods, pens, felt tips, fibre tips, card, wood, (wood) stains, metal, inking pads, or inks for impact printing, (with impact-pressure ink ribbons), or for the preparation of colorants, for coatings, e.g. paints, for textile decoration and industrial marking, for roller coatings or powder coatings or for automotive finishes for high-solids, for low-solvent, water containing or metallic coating materials or for water-containing formulations, water-containing paints, or for the preparation of pigmented plastics, fibres, platters or mold carriers, or for pigmented radiation curable coatings, or for pigmented gel coats, laminates, composites, adhesives and casting resins, or for non-impact printing material, for digital printing, thermal wax transfer printing, inkjet printing or thermal transfer printing, or for the preparation of colour filters, especially for visible light in the range from 400 to 700 nm, which can be used for the production of liquid crystal displays (LCDs) or charge combined devices (CCDs), for the preparation of cosmetics, toners, or polymeric ink particles for the preparation of toners, such as dry or liquid copy toners or electro photographic toners. The toners can be prepared in master batches and be used in turn in master batches for the preparation of coloured plastics.

The terms and definitions used in the specification of the present invention preferably have the following meanings:
Component a)

The term dispersing agent is defined within the limits of a so-called solid/liquid dispersion, as opposed to other types of dispersions, such as liquid/liquid (e.g. emulsions) or solid/gas (e.g. fumes) dispersions. Solid/liquid dispersions that apply consist of a two-phase system containing insoluble solid particles or solid particles of low solubility within a liquid. The dispersing agent enables solid particles, in the instant case pigment particles, to be distributed homogeneously within a liquid phase, e.g. water or organic solvent, or mixtures of both, or a polymer melt. Homogeneous distribution means that the concentration of the solid particles within the liquid phase in any volume fraction of the liquid phase is identical or approximately identical (even distribution of the solid particles).

The term block copolymer comprises random block, multi block, star or gradient copolymers. The copolymer blocks A and B consist of at least two repeating units of polymerisable ethylenically unsaturated monomers.

The term polymerisable ethylenically unsaturated monomers applies to monomeric compounds characterised by the presence of the structural moiety >C=C< which are polymerisable in the known method of controlled or living polymerisation. Controlled or living polymerisation is defined as a process wherein the polymerisation is initiated from an initiating fragment which adds monomers by radical polyaddition reactions under conditions which suppress unwanted side reactions, such as radical transfer to solvent, bimolecular termination or disproportionation. The suppression of such unwanted side reactions is realised to the necessary extend, that the formation of a block copolymer by subsequent addition of different monomers can be realised. The method of living polymerisation is described in U.S. Pat. No. 4,581,429.

In the block copolymer (I) one of X and Y represents a chain terminal group from fragments of a polymerisation initiator containing the group (A) wherein X' is cleavable from the initiator as a free radical X. and is capable of initiating the polymerisation of ethylenically unsaturated monomers. The method of polymerisation that applies is the so-called controlled polymerisation with >N—O—R compounds.

In the alternative, one of X and Y represents the fragment of a free radical initiator and the other one represents the chain terminal group from the free nitroxyl radical (B). The method of polymerisation that applies is the so-called controlled polymerisation with >N—O. compounds.

A suitable polymerisation initiator containing the group (A) is represented by the formula

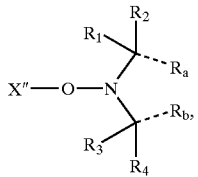

(II)

wherein

X" is cleavable from the compound (II) as a free radical X. and is capable of initiating the polymerisation of ethylenically unsaturated monomers;

one of $R_1$ and $R_2$ represents $C_1$–$C_7$alkyl or hydroxy-$C_1$–$C_7$alkyl and the other one represents $C_1$–$C_4$alkyl, $C_1$–$C_4$alkyl substituted by $C_1$–$C_4$alkoxycarbonyl or $C_1$–$C_4$alkoxy or hydroxy-$C_1$–$C_4$alkyl; or $R_1$ and $R_2$ together with the adjacent C-atom both represent $C_3$–$C_7$cycloalkyl;

$R_3$ and $R_4$ independently of one another are as defined as $R_1$ and $R_2$ or represent hydrogen;

$R_a$ represents hydrogen or a substituent selected from the group consisting of $C_1$–$C_4$alkyl, hydroxy-$C_1$–$C_4$alkyl, $C_5$–$C_{10}$aryl, $C_5$–$C_{10}$aryl-$C_1$–$C_4$alkyl, $C_1$–$C_4$alkyl-$C_5$–$C_{10}$aryl, canyo, $C_1$–$C_4$alkoxycarbonyl, $C_1$–$C_4$alkanoyloxy, $C_1$–$C_4$alkanoyloxy-$C_1$–$C_4$alkyl, carbamoyl, mono- or di- $C_1$–$C_4$alkylcarbamoyl, mono- or di-2-hydroxyethylcarbamoyl, amidino, 2-imidazolyl, 1-hydroxy-2-hydroxymethyl-2-propylcarbamoyl, 1,1-dihydroxymethyl-2-hydroxycarbamoyl and —P=O(O—$C_1$–$C_4$alkyl)$_2$; and $R_b$ is as defined as $R_a$; or $R_a$ and $R_b$ together represent a divalent group and form a 5-, 6-, 7- or 8-membered aliphatic or aromatic heterocyclic group, which may contain 1–3 additional heteroatoms selected from the group consisting of nitrogen, oxygen and sulphur.

The free radical species cleaved from a compound (II) is illustrated by the formula

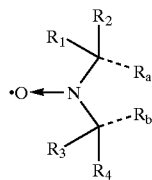

(IIA)

The group X" which is cleavable from the compound (II) as the free radical X. has at least one C-atom and is capable of initiating the polymerisation of ethylenically unsaturated monomers (>N—O—R polymerisation). In the alternative the group X" represents the fragment of a free radical initiator (>N—O. polymerisation).

X", defined as the group which is cleavable from the compound (II) as the free radical X. (>N—O—R polymerisation) is preferably selected from the group of aliphatic and cycloaliphatic substituents consisting of aryl-CH$_2$—, (CH$_3$)CH(-aryl)-, aryl-CH$_2$—CH$_2$—, (CH$_3$)$_2$C(-aryl)-, (C$_5$–C$_6$cycloalkyl)$_2$C(—CN)—, (C$_1$–C$_{12}$alkyl)$_2$C(—CN)—, —CH$_2$CH=CH$_2$, C$_1$–C$_{12}$alkyl-C(—R)[—C(=O)—C$_1$–C$_{12}$alkyl]-, C$_1$–C$_{12}$alkyl-C(—R)[—C(=O)—C$_6$–C$_{10}$aryl]-, C$_1$–C$_{12}$alkyl-C(—R)[—C(=O)—C$_1$–C$_{12}$alkoxy]-, C$_1$–C$_{12}$alkyl-C(—R)[—C(=O)-phenoxy]-, C$_1$–C$_{12}$alkyl-C(—R)[—C(=O)—N-di-C$_1$–C$_{12}$alkyl]-, C$_1$–C$_{12}$alkyl-C(—R)[—(C=O)—NH—C$_1$–C$_{12}$alkyl]-, C$_1$–C$_{12}$alkyl-C(—R)[—C(=O)—NH$_2$]-, —CH$_2$CH=CH—CH$_3$, —CH$_2$—C(CH$_3$)=CH$_2$, —CH$_2$—CH=CH-phenyl, 2-propynyl, 2-tetrahydropyranyl or 2-tetrahydrofuryl, wherein R represents hydrogen or C$_1$–C$_{12}$alkyl.

The aryl groups in these groups defined for X' may additionally be substituted with a substituent selected from the group consisting of C$_1$–C$_{12}$alkyl, halogen, C$_1$–C$_{12}$alkoxy, C$_1$–C$_{12}$alkyl-carbonyl, glycidyloxy, OH, —COOH and —COOC$_1$–C$_{12}$alkyl.

X" is preferably selected from the group of aliphatic and cycloaliphatic substituents consisting of phenyl-CH$_2$—, CH$_3$CH(-phenyl)-, (CH$_3$)$_2$C(-phenyl)-, (C$_5$–C$_6$cycloalkyl)$_2$C(—CN)—, (CH$_3$)$_2$C(—CN)—, —CH$_2$=CH—CH$_2$—, CH$_3$CH(—CH=CH$_2$)—, C$_1$–C$_8$alkyl-C(—R)[—C(=O)-phenyl]-, C$_1$–C$_8$alkyl-C(—R)[—C(=O)—C$_1$–C$_8$alkoxy]-, C$_1$–C$_8$alkyl-C(—R)[—C(=O)-C$_1$–C$_8$alkyl]-, C$_1$–C$_8$alkyl-C(—R)[—C(=O)—N-di-C$_1$–C$_8$alkyl]-, C$_1$–C$_8$alkyl-C(—R)[—C(=O)—NH—C$_1$–C$_8$alkyl]- and C$_1$–C$_8$alkyl-C(—R)[—C(=O)—NH$_2$]-, wherein R is hydrogen or C$_1$–C$_8$alkyl.

A particularly preferred group of substituents X" is selected from the group of aliphatic and cycloaliphatic substituents consisting of phenyl-CH$_2$—, CH$_3$CH(-phenyl)-, (CH$_3$)$_2$C(-phenyl)-, (C$_5$–C$_6$cycloalkyl)$_2$C(—CN)—, (CH$_3$)$_2$C(—CN)—, —CH$_2$=CH—CH$_2$—, CH$_3$CH(—CH=CH$_2$)—, C$_1$–C$_4$alkyl-C(—R)[—C(=O)-phenyl]-, C$_1$–C$_4$alkyl-C(—R)[—C(=O)-C$_1$–C$_4$alkoxy]-, C$_1$–C$_4$alkyl-C(—R)[—C(=O)—C$_1$–C$_4$alkyl]-, C$_1$–C$_4$alkyl-C(—R)[—C(=O)—N-di-C$_1$–C$_4$alkyl]-, C$_1$–C$_4$alkyl-C(—R)[—C(=O)—NH—C$_1$–C$_4$alkyl]- and C$_1$–C$_4$alkyl-C(—R)[—C(=O)—NH$_2$]-, wherein R is hydrogen or C$_1$–C$_4$alkyl.

A compound wherein the free nitroxyl radical (B) is present, is represented by the formula IIA. The free nitroxyl radical is generated from a compound (II), wherein X" is the fragment of a free radical initiator.

X" defined as the fragment of a free radical initiator (>N—O. polymerisation) is a fragment from known free radical initiators used as sources of free radicals in so-called living polymerisation reactions, e.g. a suitable bis azo compound, a peroxide or a hydroperoxide.

Suitable bis azo compounds are commercially available, e.g. 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dehydrate, 2-phenylazo-2,4-dimethyl-4-methoxyvaleronitrile, dimethyl 2,2'-azobisisobutyrate, 2-(carbamoylazo)isobutyronitrile, 2,2'-azobis(2,4,4-trimethylpentane), 2,2'-azobis(2-methyl-propane), 2,2'-azobis(N,N'-dimethyleneisobutyramidine) as free base or hydrochloride, 2,2'-azobis(2-amidinopropane) as free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide}.

Suitable peroxides and hydroperoxides are commercially available, e.g. acetylcyclohexanesulphonyl peroxide, diisopropyl peroxydicarbonate, tert-amyl perneodecanoate, tert-butylperneodecanoate, tert-butylperpivalate, tert-amylperpivalate, bis(2,4-dichlorobenzoyl) peroxide, diisononanoyl peroxide, didecanoyl peroxide, dioctanoyl peroxide, dilauroyl peroxide, bis(2-methylbenzoyl) peroxide, disuccinoyl peroxide, diacetyl peroxide, dibenzoyl peroxide, tert-butyl per-2-ethylhexanoate, bis(4-chlorobenzoyl) peroxide, tert-butyl perisobutyrate, tertbutyl permaleate, 1,1-bis(tert-butylperoxy)-3,5,5-trimethyl-cyclohexane, 1,1-bis(tert-butylperoxy)cyclohexane, tert-butyl peroxyisopropyl carbonate, tert-butyl perisononaoate, 2,5-di-methylhexane 2,5-dibenzoate, tert-butyl peracetate, tert-amyl perbenzoate, tert-butyl perbenzoate, 2,2-bis(tert-butylperoxy)butane, 2,2-bis (tert-butylperoxy)propane, dicumyl peroxide, 2,5-dimethylhexane 2,5-di-tert-butylperoxid, 3-tert-butylperoxy-3-phenyl phthalide, ditert-amyl peroxide, α,α'-bis(tert-butylperoxyisopropyl) benzene, 3,5-bis(tert-butylperoxy)-3,5-dimethyl-1,2-dioxolane, di-tert-butyl peroxide, 2,5-dimethylhexyne 2,5-di-tert-butyl peroxide, 3,3,6,6,9,9-hexamethyl-1,2,4,5-tetraoxacyclononane, p-menthane hydroperoxide, pinane hydroperoxide, diisopropylbenzene mono-α-hydroperoxide, cumene hydroperoxide or tert-butyl hydroperoxide.

In a compound (II) the substituents $R_1$, $R_2$ and $R_a$ and $R_3$, $R_4$ and $R_b$ together with the adjacent C-atom on the nitrogen atom preferably represent groups of the partial formulae

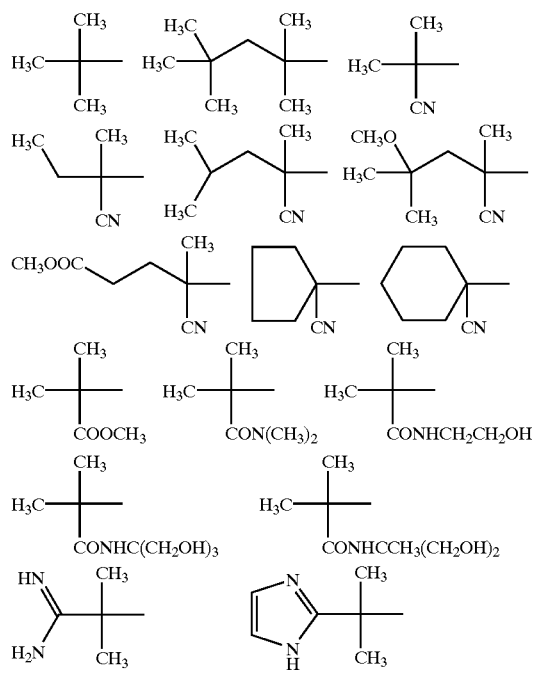

In a preferred embodiment one of $R_1$ and $R_2$ represents methyl and the other one represents methyl or ethyl and one of $R_3$ and $R_4$ represents methyl and the other one represents methyl or ethyl and $R_a$ and $R_b$ together represent a group of the partial formula

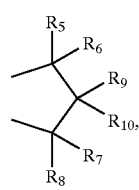

(A$_0$)

wherein $R_5$, $R_6$, $R_7$ and $R_8$ independently of one another represent hydrogen, methyl or ethyl; and one of $R_9$ and $R_{10}$ independently of the other represents hydrogen or substituents or $R_9$ and $R_{10}$ both represent substituents.

In a preferred embodiment of the invention the chain terminal group from fragments of a polymerisation initiator containing the group (A) or from the free nitroxyl radical (B) represents a group of the partial formula

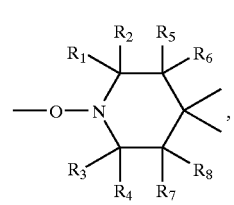

(B$_0$)

wherein $R_1$–$R_8$ are as defined above and the 4-position is substituted by one or two substituents. Preferred groups $B_0$ which contain substituents in 4-position are represented by the partial formulae

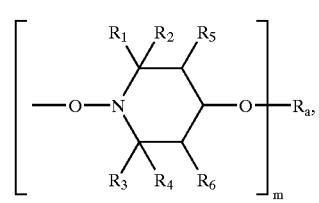

(B$_1$)

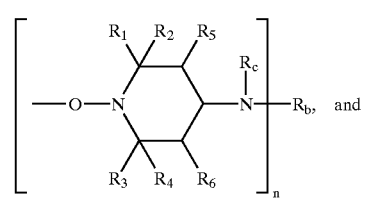

(B$_2$)

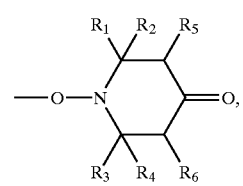

(B$_3$)

wherein
$R_1$–$R_6$ are as defined above;
m represents a numeral from one to four;
n represents one, two or three;
if m represents one,
$R_a$ represents hydrogen, $C_1$–$C_{18}$alkyl which is uninterrupted or interrupted by one or more oxygen atoms, 2-cyanoethyl, benzoyl, glycidyl, or represents a monovalent radical of an aliphatic carboxylic acid having 2 to 18 C-atoms, of a cycloaliphatic carboxylic acid having 7 to 15 C-atoms, of an a,b-unsaturated carboxylic acid having 3 to 5 C-atoms or of an aromatic carboxylic acid having 7 to 15 C-atoms, where each carboxylic acid can be substituted in the aliphatic, cycloaliphatic or aromatic moiety by 1 to 3-COOZ groups, in which Z represents H, $C_1$–$C_{20}$alkyl, $C_3$–$C_{12}$alkenyl, $C_5$–$C_7$cycloalkyl, phenyl or benzyl; or
$R_a$ represents a monovalent radical of a carbamic acid or phosphorus-containing acid or a monovalent silyl radical; or
if m represents 2,
$R_a$ represents $C_2$–$C_{12}$alkylene, $C_4$–$C_{12}$alkenylene, xylylene, or represents a divalent radical of an aliphatic dicarboxylic acid having 2 to 36 C-atoms, of a cycloaliphatic or aromatic dicarboxylic acid having 8 to 14 C-atoms or of an aliphatic, cycloaliphatic or aromatic dicarbamic acid having 8 to 14 C-atoms, where each dicarboxylic acid may be substituted in the aliphatic, cycloaliphatic or aromatic moiety by one or two —COOZ groups; or $R_a$ is a divalent radical of a phosphorus-containing acid or a divalent silyl radical; or if m represents 3, $R_a$ represents a trivalent radical of an aliphatic, cycloaliphatic or aromatic tricarboxylic acid, which may be substituted in the aliphatic, cycloaliphatic or aromatic moiety by —COOZ, of an aromatic tricarbamic acid or of a phosphorus-containing acid, or is a trivalent silyl radical; or if m represents 4, $R_a$ represents a tetravalent radical of an aliphatic, cycloaliphatic or aromatic tetracarboxylic acid;

if n represents one, $R_b$ represents $C_1$–$C_{12}$alkyl, $C_5$–$C_7$cycloalkyl, $C_7$–$C_8$aralkyl, $C_2$–$C_{18}$alkanoyl, $C_3$–$C_5$alkenoyl or benzoyl;

$R_c$ represents $C_1$–$C_{18}$alkyl, $C_5$–$C_7$cycloalkyl, $C_2$–$C_8$alkenyl unsubstituted or substituted by a cyano, carbonyl or carbamide group, glycidyl, or represents a group of the formulae —$CH_2CH(OH)$—Z, —CO—Z— or —CONH—Z, wherein Z represents hydrogen, methyl or phenyl, or $R_b$ and $R_c$ together represent the cyclic acyl radical of an aliphatic or aromatic 1,2- or 1,3-dicarboxylic acid;

if n represents two, $R_b$ is as defined above; and $R_c$ represents $C_2$–$C_{12}$alkylene, $C_6$–$C_{12}$arylene, xylylene, a —$CH_2CH(OH)CH_2$—O—B—O—$CH_2CH(OH)CH_2$— group, wherein B represents $C_2$–$C_{10}$alkylene, $C_6$–$C_{15}$-arylene or $C_6$–$C_{12}$cycloalkylene; or, provided that $R_b$ is not alkanoyl, alkenoyl or benzoyl, $R_c$ represents a divalent acyl radical of an aliphatic, cycloaliphatic or aromatic dicarboxylic acid or dicarbamic acid, or represents the group —CO—; or $R_c$ represents a group of the partial formula

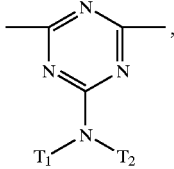

($C_0$)

wherein $T_1$ and $T_2$ independently of the other represent hydrogen, $C_1$–$C_{18}$alkyl, or $T_1$ and $T_2$ together represent $C_4$–$C_6$alkylene or 3-oxapentamethylene; or if n represents 3, $R_c$ represents 2,4,6-triazinyl.

A highly preferred group $B_0$ which contains substituents in 4-position is selected from the group consisting of the partial formulae $B_1$ and $B_2$, wherein m represents 1;

$R_a$ represents hydrogen, $C_1$–$C_{18}$alkyl which is uninterrupted or interrupted by one or more oxygen atoms, 2-cyanoethyl, benzoyl, glycidyl, or represents a monovalent radical of an aliphatic carboxylic acid having 2 to 12 C-atoms, of a cycloaliphatic carboxylic acid having 7 to 15 C-atoms, of an a,b-unsaturated carboxylic acid having 3 to 5 C-atoms or of an aromatic carboxylic acid having 7 to 15 C-atoms;

m represents 2;

$R_a$ represents a divalent radical of an aliphatic dicarboxylic acid having 2 to 36 C-atoms;

n represents 1;

$R_b$ represents $C_1$–$C_{12}$alkyl, $C_5$–$C_7$cycloalkyl, $C_7$–$C_8$aralkyl, $C_2$–$C_{18}$alkanoyl, $C_3$–$C_5$alkenoyl or benzoyl; and $R_c$ represents $C_1$–$C_{18}$alkyl, $C_5$–$C_7$cycloalkyl, $C_2$–$C_8$alkenyl unsubstituted or substituted by a cyano, carbonyl or carbamide group, glycidyl, or represents a group of the formula —$CH_2CH(OH)$—Z, —CO—Z or —CONH—Z, wherein Z represents hydrogen, methyl or phenyl.

Another highly preferred group $B_0$ which contains substituents in 4-position is selected from the group consisting of the partial formulae $B_1$ and $B_2$, wherein m represents 1;

$R_a$ represents hydrogen, $C_1$–$C_{18}$alkyl, 2-cyanoethyl, benzoyl, glycidyl, or a monovalent radical of an aliphatic carboxylic acid having 2 to 12 C-atoms;

m represents 2;

$R_a$ represents a divalent radical of an aliphatic dicarboxylic acid having 2 to 36 C-atoms;

n represents 1;

$R_b$ represents $C_1$–$C_{12}$alkyl, $C_7$–$C_8$aralkyl, $C_2$–$C_{18}$alkanoyl, $C_3$–$C_5$alkenoyl or benzoyl; and $R_c$ represents $C_1$–$C_{18}$alkyl, glycidyl, a group of the formulae —$CH_2CH(OH)$—Z or —CO—Z, wherein Z represents hydrogen, methyl or phenyl.

Another particularly preferred embodiment relates to the group $B_0$, wherein one of $R_9$ and $R_{10}$ represents hydrogen and the other one $C_1$–$C_4$alkanoylamino.

In the block copolymer (I) one of the polymer blocks A and B is composed of non-ionic repeating units of ethylenically unsaturated monomers suitable for the method of controlled or living polymerisation. These monomers are characterised by the presence of at least one group >C═C<. Representative monomers are selected from the group consisting of styrenes, acrylic and $C_1$–$C_4$alkylacrylic acid-$C_1$–$C_{24}$alkyl esters, acrylic and $C_1$–$C_4$alkylacrylic acid-$C_6$–$C_{11}$aryl-$C_1$–$C_4$alkyl esters, acrylic and $C_1$–$C_4$alkylacrylic acid-$C_6$–$C_{11}$aryloxy-$C_1$–$C_4$alkyl esters, acrylic and $C_1$–$C_4$alkylacrylic acid-hydroxy-$C_2$–$C_6$alkyl esters, acrylic and $C_1$–$C_4$alkylacrylic acid-polyhydroxy-$C_3$–$C_6$alkyl esters, acrylic and $C_1$–$C_4$alkylacrylic acid-($C_1$–$C_4$alkyl)$_3$silyloxy-$C_2$–$C_4$alkyl esters; acrylic and $C_1$–$C_4$alkylacrylic acid-($C_1$–$C_4$alkyl)$_3$silyl-$C_1$–$C_4$alkyl esters, acrylic and $C_1$–$C_4$alkylacrylic acid-heterocyclyl-$C_2$–$C_4$alkyl esters; acrylic and $C_1$–$C_4$alkylacrylic acid esters having poly-$C_2$–$C_4$alkyleneglycolester groups, wherein the ester groups may be substituted with $C_1$–$C_{24}$alkoxy groups, acrylic and methacrylic acid amides, acrylic and $C_1$–$C_4$alkylacrylic acid-($C_1$–$C_4$alkyl)$_{1-2}$amide, acrylonitrile, esters of maleic acid or fumaric acid, maleinimide and N-substituted maleinimides.

In a preferred embodiment of the invention one of the polymer blocks A and B is essentially composed of repeating units of ethylenically unsaturated monomers selected from the group consisting of styrenes, acrylic and methacrylic acid-$C_1$–$C_{24}$alkyl esters, acrylic and methacrylic acid-hydroxy-$C_2$–$C_6$alkyl esters, acrylic and methacrylic acid-dihydroxy-$C_3$–$C_4$alkyl esters and acrylic and methacrylic acid esters having poly-$C_2$–$C_4$alkyleneglycolester groups, wherein the ester groups may be substituted with $C_1$–$C_{24}$alkoxy groups.

Suitable styrenes may be substituted at the phenyl group by one to three additional substituents selected from the group consisting of hydroxy, $C_1$–$C_4$alkoxy, e.g. methoxy or ethoxy, halogen, e.g. chloro, and $C_1$–$C_4$alkyl, e.g. methyl or methyl.

Suitable acrylic acid or methacrylic acid-$C_1$–$C_{24}$alkyl esters are acrylic acid or methacrylic acid esters esterified by methyl, ethyl, n-butyl, isobutyl, tert-butyl, neopentyl, 2-ethylhexyl, isobornyl, isodecyl, n-dodecyl, n-tetradecyl, n-hexadecyl or n-octadecyl.

Representative acrylic and $C_1$–$C_4$alkylacrylic acid-$C_6$–$C_{11}$aryl-$C_1$–$C_4$alkyl esters are acrylic acid or methacrylic acid esters esterified by benzyl, 2-phenylethyl, 1- or 2-naphthylmethyl or 2-(1- or 2-naphthyl)-ethyl. The phenyl or naphthyl groups may be additionally substituted with one to three additional substituents selected from the group consisting of hydroxy, $C_1$–$C_4$alkoxy, e.g. methoxy or ethoxy, halogen, e.g. chloro, and $C_1$–$C_4$alkyl, e.g. methyl or methyl.

Representative acrylic and $C_1$–$C_4$alkylacrylic acid-$C_6$–$C_{11}$aryloxy-$C_1$–$C_4$alkyl esters are acrylic acid or methacrylic acid esters esterified by phenoxyethyl or benzyioxyethyl.

Representative acrylic acid and $C_1$–$C_4$alkylacrylic acid-hydroxy-$C_2$–$C_4$alkyl esters are acrylic acid- or methacrylic acid-2-hydroxyethylesters (HEA, HEMA) or acrylic acid- or methacrylic acid-2-hydroxypropylester (HPA, HPMA).

Representative acrylic and $C_1$–$C_4$alkylacrylic acid-polyhydroxy-$C_3$–$C_6$alkyl esters are acrylic acid- or methacrylic acid esterified by ethylene glycol or glycerol.

Representative acrylic acid- and $C_1$–$C_4$alkylacrylic acid-silyloxy-$C_2$–$C_4$alkyl ester are acrylic acid- or methacrylic acid-2-trimethylsilyloxyethylesters (TMS-HEA, TMS-HEMA).

Representative acrylic acid- or $C_1$–$C_4$alkylacrylic acid-($C_1$–$C_4$alkyl)$_3$silyl-$C_2$–$C_4$alkyl esters are acrylic acid- or methacrylic acid-2-trimethylsilylethylesters or acrylic acid- or methacrylic acid-3-trimethylsilyl-n-propylesters.

Representative acrylic and $C_1$–$C_4$alkylacrylic acid esters having poly-$C_2$–$C_4$alkyleneglycolester groups, wherein the ester groups may be substituted with $C_1$–$C_{24}$alkoxy groups, are illustrated by the formula given below:

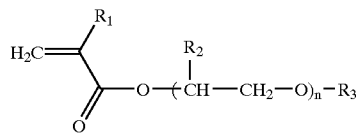

wherein n represents a numeral from one to 100;

$R_1$ and $R_2$ independently of one another represent hydrogen or methyl; and $R_3$ represents $C_1$–$C_{24}$alkyl, e.g. methyl, ethyl, n- or isopropyl, n-, iso-, or tert-butyl, n- or neopentyl, n-dodecyl, n-tetradecyl, n-hexadecyl, n-octadecyl, or represents aryl-$C_1$–$C_{24}$alkyl, e.g. benzyl or phenyl-n-nonyl, as well as $C_1$–$C_{24}$alkylaryl or $C_1$–$C_{24}$alkylaryl-$C_1$–$C_{24}$alkyl.

Representative acrylic acid- and $C_1$–$C_4$alkylacrylic acid-heterocyclyl-$C_2$–$C_4$alkyl esters are acrylic acid- or methacrylic acid-2-(N-morpholinyl, 2-pyridyl, 1-imidazolyl, 2-oxo-1-pyrrolidinyl, 4-methylpiperidin-1-yl or 2-oxoimidazolidin-1-yl)-ethyl esters.

Representative $C_1$–$C_4$alkylacrylic acid esters having poly-$C_2$–$C_4$alkyleneglycolester groups, wherein the ester groups may be substituted with $C_1$–$C_{24}$alkoxy groups are acrylic acid- or methacrylic acid esters of ethoxylated decanol, ethoxylated lauryl alcohol or ethoxylated stearyl alcohol, wherein the degree of ethoxylation, as expressed by the index n in the formula above, is typically in the range from 5 to 30.

Representative acrylic and $C_1$–$C_4$alkylacrylic acid-($C_1$–$C_4$alkyl)$_{1-2}$amide are acrylic acid- or methacrylic acid N-methyl, N,N-dimethyl, N-ethyl or N,N-diethyl amide.

Representative esters of maleic acid or fumaric acid are the $C_1$–$C_{24}$alkyl esters, e.g. the methyl, ethyl, n-butyl, isobutyl, tert-butyl, neopentyl, 2-ethyihexyl, isobornyl, isodecyl, n-dodecyl, n-tetradecyl, n-hexadecyl or n-octadecyl esters, the $C_6$–$C_{11}$aryl, e.g. phenyl or naphthyl, esters or the $C_6$–$C_{11}$aryl-$C_1$–$C_4$alkyl esters, e. g. benzyl or 2-phenethyl esters. The phenyl or naphthyl groups may be additionally substituted with one to three additional substituents selected from the group consisting of hydroxy, $C_1$–$C_4$alkoxy, e.g. methoxy or ethoxy, halogen, e.g. chloro, and $C_1$–$C_4$alkyl, e.g. methyl or methyl.

Representative N-substituted maleinimides are the N-$C_1$–$C_4$alkyl, e.g. N-methyl or N-ethyl, or N-aryl, e.g. N-phenyl substituted maleinimides.

In the block copolymer (I) one of the polymer blocks A or B additionally contains repeating units of ethylenically unsaturated monomers substituted with ionic groups. A suitable ethylenically unsaturated monomer substituted with an ionic group present in one of the polymer blocks A and B is represented by the cationic or anionic part of a salt formed from a compound of the formula $$CH_2=C(-R^1)-C(=O)-R^2 \qquad (III),$$

wherein $R^1$ represents hydrogen or $C_1$–$C_4$alkyl; and $R^2$ represents —OH, $C_1$–$C_4$alkyl substituted by carboxy, sulpho or phosphono or amino substituted $C_2$–$C_{18}$alkoxy selected from the group consisting of amino-$C_2$–$C_{18}$alkoxy, $C_1$–$C_4$alkylamino-$C_2$–$C_{18}$alkoxy, di-$C_1$–$C_4$alkylamino-$C_2$–$C_{18}$alkoxy, hydroxy-$C_2$–$C_4$alkylamino-$C_2$–$C_{18}$alkoxy and $C_1$–$C_4$alkyl-(hydroxy-$C_2$–$C_4$alkyl)amino-$C_2$–$C_{18}$alkoxy.

In a particularly preferred embodiment of the invention the repeating unit of an ethylenically unsaturated monomer substituted with an ionic group present in one of the polymer blocks A and B is represented by the cationic or anionic part of a salt formed from a compound of the formula (III), wherein $R^1$ represents hydrogen or methyl; and $R^2$ represents amino substituted $C_2$–$C_{18}$alkoxy selected from the group consisting of amino-$C_2$–$C_4$alkoxy, $C_1$–$C_4$alkylamino-$C_2$–$C_4$alkoxy, di-$C_1$–$C_4$alkylamino-$C_2$–$C_4$alkoxy, hydroxy-$C_2$–$C_4$alkylamino-$C_2$–$C_{18}$alkoxy and $C_1$–$C_4$alkyl-(hydroxy-$C_2$–$C_4$alkyl)amino-$C_2$–$C_4$alkoxy.

In an alternative embodiment the repeating unit of an ethylenically unsaturated monomer present in one of the polymer blocks A and B is the acid addition salt or the salt formed by quaternisation of an amino monomer selected from the group consisting of amino substituted styrene, ($C_1$–$C_4$alkyl)$_{1-2}$amino substituted styrene, N-mono-($C_1$–$C_4$alkyl)$_{1-2}$amino-$C_2$–$C_4$alkyl(meth)acrylamide and N,N-di-($C_1$–$C_4$alkyl)$_{1-2}$amino-$C_2$–$C_4$alkyl(meth) acrylamide, vinylpyridine or $C_1$–$C_4$alkyl substituted vinylpyridine, vinylimidazole and $C_1$–$C_4$alkyl substituted vinylimidazole.

Representative styrenes are substituted at the phenyl group with one or two amino groups or one or two $(C_1$–$C_4$alkyl$)_{1-2}$ amino groups, particularly one amino group in 4-position. Additional substituents are selected from the group consisting of hydroxy, $C_1$–$C_4$alkoxy, e.g. methoxy or ethoxy, halogen, e.g. chloro, or $C_1$–$C_4$alkyl, e.g. methyl or ethyl.

Representative N-mono-$(C_1$–$C_4$alkyl$)_{1-2}$amino-$C_2$–$C_4$alkyl(meth)acrylamide and N,N-di-$(C_1$–$C_4$alkyl$)_{1-2}$ amino-$C_2$–$C_4$alkyl(meth)acrylamide are 2-N-tert-butylamino- or 2-N,N-dimethyl-aminoethylacryl or 2-N-tert-butylamino- or 2-N,N-dimethylaminopropylmethacrylamide.

In another preferred embodiment of the invention the repeating unit of an ethylenically unsaturated monomer substituted with an ionic group present in one of the polymer blocks A and B is the acid addition salt or the salt formed by quaternisation of an amino monomer selected from the group consisting of amino substituted styrene, $(C_1$–$C_4$alkyl$)_{1-2}$amino substituted styrene, and N,N-di-$(C_1$–$C_4$alkyl$)_2$ amino-$C_2$–$C_4$alkyl(meth)acrylamide.

In a particularly preferred embodiment of the invention the cationic part of a salt formed from a compound of the formula (III) is represented by an ester group of the formula

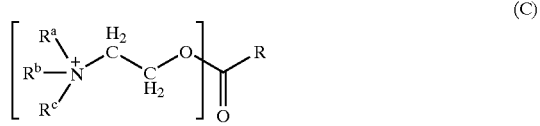

(C)

wherein
one of $R^a$, $R^b$ and $R^c$ represents 2-hydroxyethyl and the other ones represent hydrogen, methyl or ethyl; or
$R^a$, $R^b$ and $R^c$ independently of one another represent hydrogen or a substituent selected from the group consisting of $C_1$–$C_4$alkyl, aryl-$C_1$–$C_4$alkyl and $(C_1$–$C_4$alkyl$)_{1-3}$aryl.

In an especially preferred embodiment of the invention the repeating unit of an ethylenically unsaturated monomer substituted with an ionic group is represented by the cationic part of an acid addition salt or the salt formed by quaternisation of 4-aminostyrene, 4-dimethylaminostyrene and an aminoalkyl (meth)acrylate selected from the group consisting of 2-dimethylaminoethyl acrylate (DMAEA), 2-dimethylaminoethyl methacrylate (DMAEMA), 2-diethylaminoethyl acrylate (DEAEA), 2-diethylaminoethyl methacrylate (DEAEMA), 2-t-butylaminoethyl acrylate (t-BAEA), 2-t-butylaminoethyl methacrylate (t-BAEMA) and 3-dimethylaminopropylmethacrylamide, 4-vinylpyridine, 2-vinylpyridine or 1-vinylimidazole.

The index numbers x and y represent values greater than zero and define the number of monomer units present in the polymer blocks A and B. The index numbers x and y independently of one another represent one or numerals greater than one. A range from two to 1000 is preferred for the sum of x and y. The preferred molecular weight range of both polymer blocks A and B is from about 1000 to 100000, preferably about 1000 to 50000. A particularly preferred molecular weight range is from about 1000 to 15000.

The copolymers (I) defined above, e.g. an oligomer, a co-oligomer or a copolymer (block or random) are prepared in a manner which is by itself known, by free radical polymerisation of at least one ethylenically unsaturated monomer or oligomer. The method of polymerisation that applies is the so-called living polymerisation with >N—O—R compounds or the so-called living polymerisation with >N—O. compounds.

In the composition according to the present invention the component (ii) forms a salt with the block copolymer (I) by acid-base reaction, acid addition or quaternisation reaction.

In particular, an acidic group, such as the sulpho, carboxy or phosphono group, a sulphonic acid-$C_1$–$C_4$alkyl ester group or a alkyl halide group, which is present in the salt forming component (ii), forms a salt by reaction with a free amino group or a primary, secondary or tertiary amino group which is present in one of the polymer blocks A and B of the block copolymer component (I).

In an alternative embodiment of the invention the acidic group, such as the sulpho, carboxy or phosphono group may be present in one of the polymer blocks A and B of the block copolymer component (I). In that event the primary, secondary or tertiary amino group is present in the salt forming component (ii).

The salt forming groups mentioned above, present in the salt forming component (ii), particularly the sulpho, carboxy or phosphono group, or a free amino group or a primary, secondary or tertiary amino group may be attached to any aliphatic, cycloaliphatic, aliphatic cycloaliphatic, aromatic or aromatic aliphatic hydrocarbon backbone. The backbone may be linear, cyclic or slightly or highly branched and may consist of C-atoms exclusively or may additionally contain heteroatoms, particularly oxygen, nitrogen, sulphur, phosphorus, silicon or boron.

In a preferred embodiment of the invention the salt forming component (ii) is selected from the group consisting of mono-, bi- or tricyclic sulphonic, carboxylic or phosphonic acids and aliphatic sulphonic, carboxylic or phosphonic acids substituted with mono-, bi- or tricyclic groups alkyl halides substituted with mono-, bi- or tricyclic groups, and $C_1$–$C_4$alkyl esters of mono-, bi- or tricyclic sulphonic acids.

The mono-, bi-, or tricyclic groups present in the sulphonic, carboxylic and phosphonic acids or the mono-, bi-, or tricyclic substituents of the aliphatic sulphonic, carboxylic or phosphonic acids and alkyl halides are selected from the group consisting of saturated or unsaturated mono-, bi-, or tricycloaliphatic, heteromonocycloaliphatic or heterobicycloaliphatic, carbomonocyclic or carbobicyclic aromatic, partially saturated carbobicyclic aromatic, heteromonocyclic or heterobicyclic aromatic and partially saturated heterobicyclic aromatic groups.

Representative salt forming components (ii) which are selected from the group consisting of mono-, bi-, or tricyclic sulphonic, carboxylic and phosphonic acids or representative salt forming components (ii) which are selected from the group of aliphatic sulphonic, carboxylic or phosphonic acids substituted with monocyclic, bicyclic or tricyclic groups are illustrated by the list given below:

A preferred group of substituted mono-, bi-, or tricyclic sulphonic, carboxylic and phosphonic acids is represented by the general formula:

(IV)

wherein
X represents carboxy, sulpho or $P(=O)(OH)_2$; and $R_1$, $R_2$ or $R_3$ independently of one another represent hydrogen or a substituent selected from the group consisting of functional groups or derivatised functional groups selected from the group consisting of amino, $C_1$–$C_4$alkylamino, $C_1$–$C_4$-dialkylamino, hydroxy, oxo, thio, —$NO_2$, carboxy, carbamoyl, sulpho, sulphamoyl, ammonio, amidino, cyano, formylamino, formamido and halogen; or $R_1$, $R_2$ or $R_3$ independently of one another represent saturated or unsaturated aliphatic, cycloaliphatic or heterocycloaliphatic groups, carbocyclic or heterocyclic aryl groups, condensed carbocyclic, heterocyclic or carbocyclic-heterocyclic groups, which may additionally be combined with one of these groups or which may additionally be substituted with one of the functional groups or derivatised functional groups mentioned above.

The substituent groups may additionally be interrupted with one or more bivalent groups selected from the group consisting of —O—, —S—, —C(=O)—O—, —O—C(=O)—, —C(=O)—N($C_1$-$C_4$alkyl)—, —N($C_1$-$C_4$alkyl)—C(=O)—, —S(=O)—, —S(=O)$_2$—, —S(=O)—O—, —S(=O)$_2$—O—, —O—S(=O)—, —O—S(=O)$_2$—, —S(=O)—N($C_1$-$C_4$alkyl)-, —S(=O)$_2$—N($C_1$-$C_4$alkyl)-, —($C_1$-$C_4$alkyl)N—S(=O)—, —($C_1$-$C_4$alkyl)N—S(=O)$_2$—, —P(=O)—, —P(=O)—O—, —O—P(=O)— and —O—P(=O)—O—.

Two substituents from the group $R_1$ and $R_2$ may also represent bivalent, bridge-type $C_2$–$C_6$alkylen-, $C_4$–$C_8$-alkyldiyliden- or $C_4$–$C_8$alkenyldiyliden groups which are connected with one of the above-mentioned cyclic or bicyclic groups.

Specific salt forming components (ii), which are selected from the group consisting of mono- or bicyclic sulphonic acids, are illustrated by their structural formulae given below:

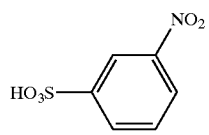

3-nitro-benzene sulphonic acid

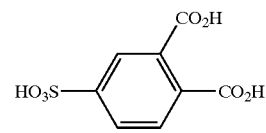

4-sulphophtalic acid

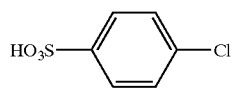

4-chlorobenzene sulphonic acid

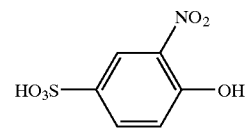

4-hydroxy-3-nitrobenzene sulphonic acid

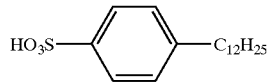

4-dodecylbenzene sulphonic acid

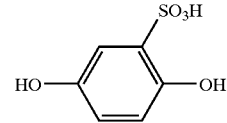

2,5-dihydroxybenzene sulphonic acid

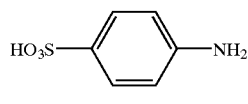

sulphanilic acid

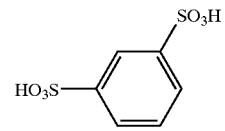

benzene-1,3-disulphonic acid

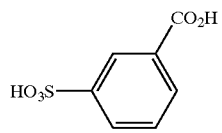

3-sulphobenzoic acid

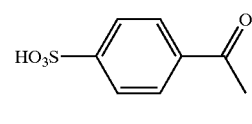

4-acetylsulphonic acid

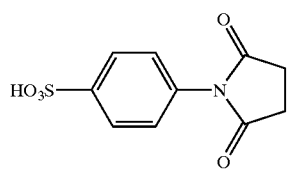

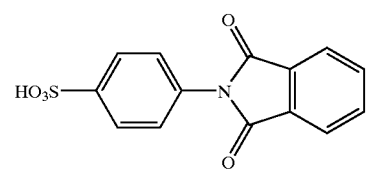

| -continued |  |
|---|---|
| 4-succinimidobenzene sulphonic acid | 4-phthalimidobenzene sulphonic acid |
| 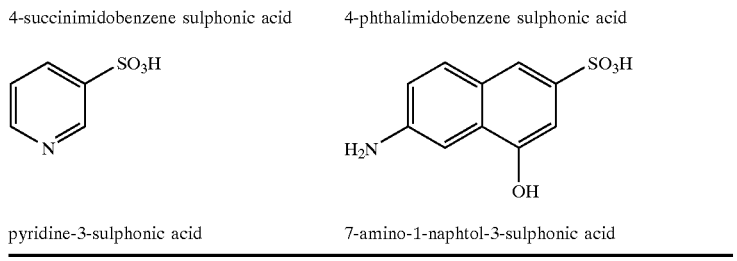 | |
| pyridine-3-sulphonic acid | 7-amino-1-naphtol-3-sulphonic acid |

Further specific salt forming components (ii), which are selected from the group consisting of mono- or bicyclic sulphonic acids are illustrated by their structural formulae given below:

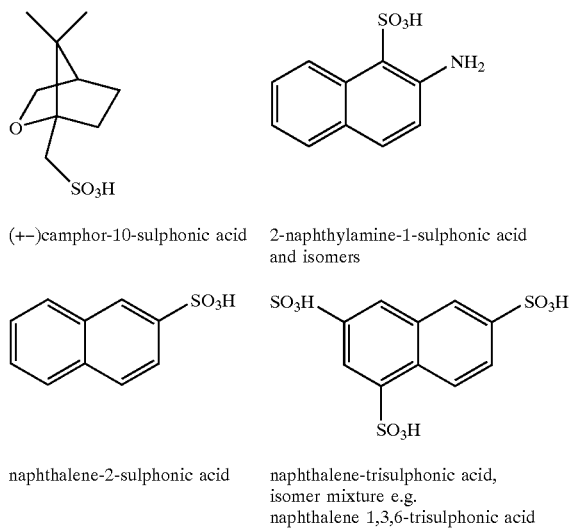

| (+−)camphor-10-sulphonic acid | 2-naphthylamine-1-sulphonic acid and isomers |
|---|---|
| naphthalene-2-sulphonic acid | naphthalene-trisulphonic acid, isomer mixture e.g. naphthalene 1,3,6-trisulphonic acid |

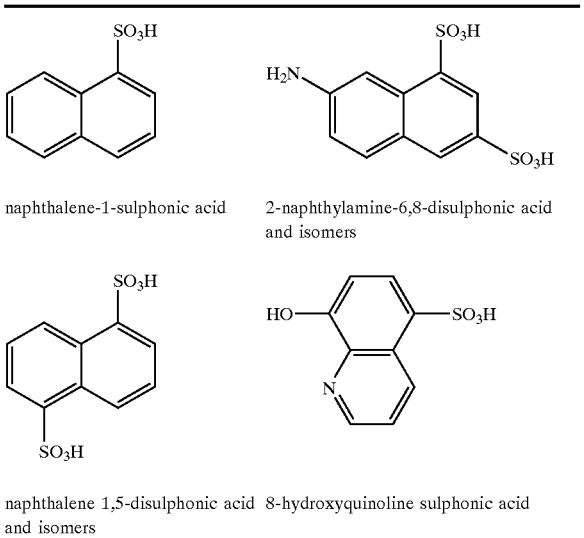

| naphthalene-1-sulphonic acid | 2-naphthylamine-6,8-disulphonic acid and isomers |
|---|---|
| naphthalene 1,5-disulphonic acid and isomers | 8-hydroxyquinoline sulphonic acid |

Specific salt forming components (ii), which are selected from the group consisting of mono- or bicyclic carboxylic acids are illustrated by their structural formulae given below:

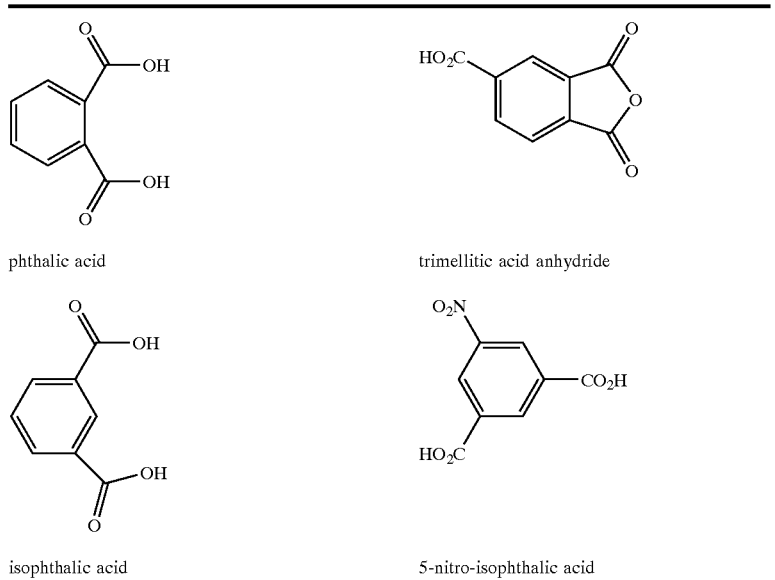

| phthalic acid | trimellitic acid anhydride |
|---|---|
| isophthalic acid | 5-nitro-isophthalic acid |

-continued

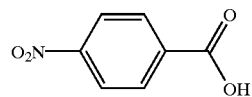

4-nitrobenzoic acid and isomers

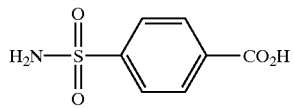

benzoic acid-4-sulphamide

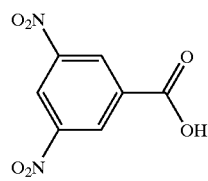

3,5-dinitrobenzoic acid and isomers

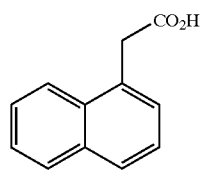

1-naphthylacetic acid

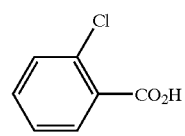

2-chlorobenzoic acid and isomers

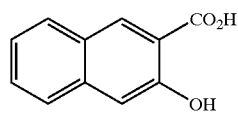

3-hydroxynaphthoic acid

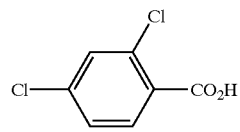

2,4-dichlorobenzoic acid and isomers

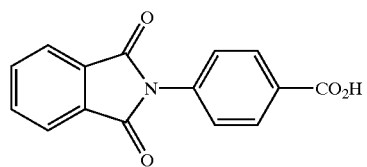

N-(4-carboxyphenyl)phthalimide

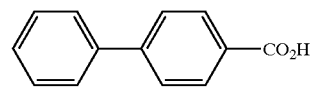

4-phenylbenzoic acid

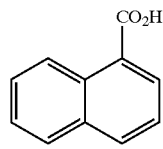

1-naphthoic acid

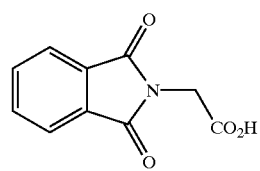

phthaloyl glycine

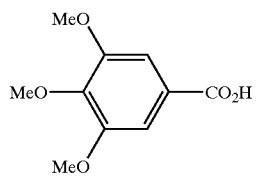

3,4,5-trimethoxybenzoic acid

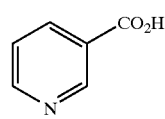

nicotinic acid

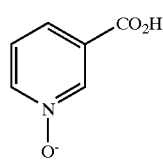

nicotinic acid N-oxide

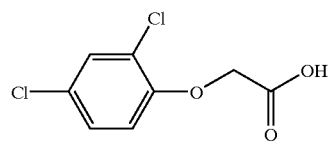

2,4-dichlorophenoxyacetic acid

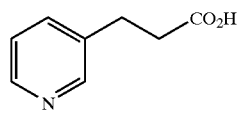

3-pyridinepropionic acid

-continued

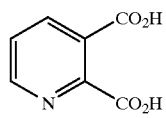

quinolinic acid

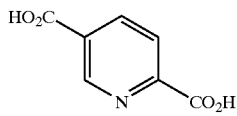

pyridine-2,5-dicarboxylic acid

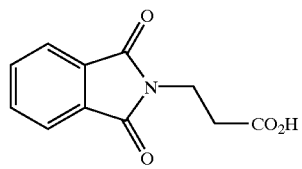

3-phthalimidopropionic acid

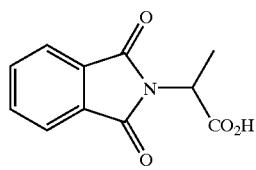

2-phthalimidopropionic acid

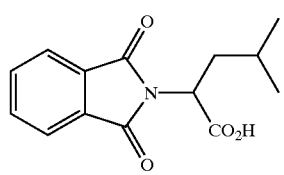

4-methyl-2-phthalimidovaleric acid

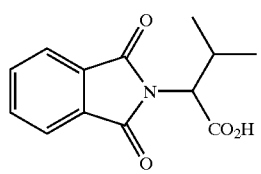

2-phthalimidoisovaleric acid

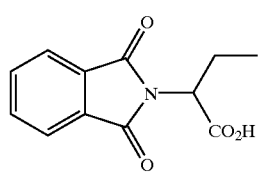

2-phthalimidobutyric acid

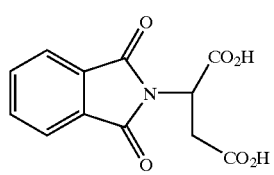

phthalimidosuccinic acid

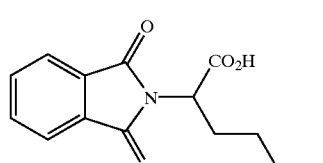

2-phthalimidoglutaric acid

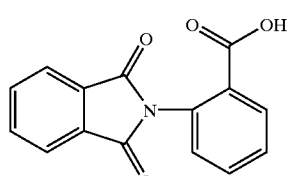

2-phthalimidobenzoic acid

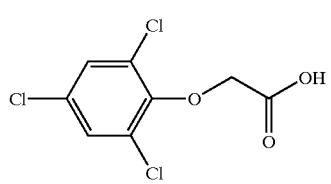

2,4,6-trichlorophenoxyacetic acid

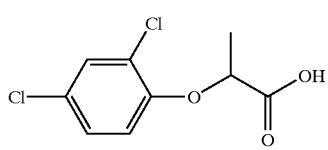

2(2,4-dichlorophenoxy)-propionic acid

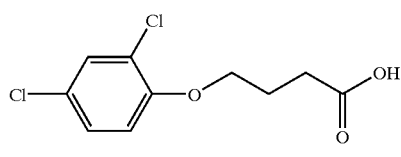

4(2,4-dichorophenoxy)-butyric acid

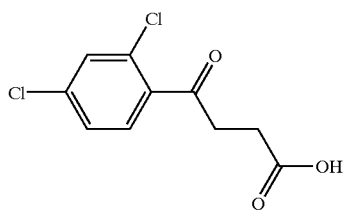

3(2,4-dichlorobenzoyl)-propionic acid

-continued

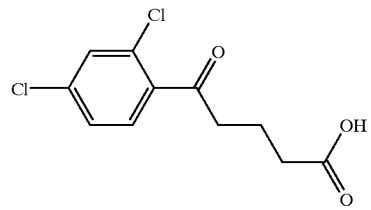

3(2,4-dichlorobenzoyl)-butyric acid

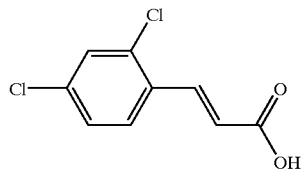

2,4-dichlorophenylacrylic acid

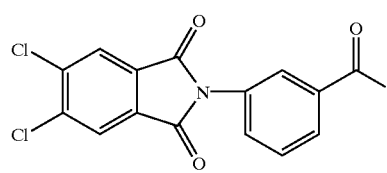

3(4,5-dichlorophthalimido)-benzoic acid

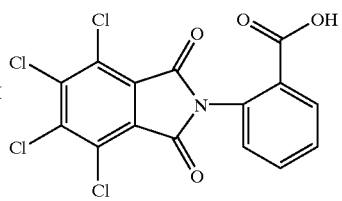

2-tetrachlorophthalimidobenzoic acid

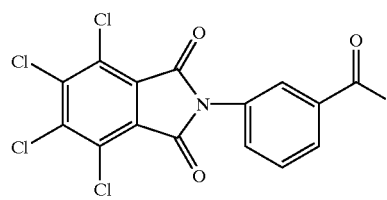

3-tetrachlorophthalimidobenzoic acid

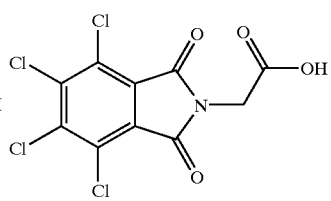

tetrachlorophthaloylglycine

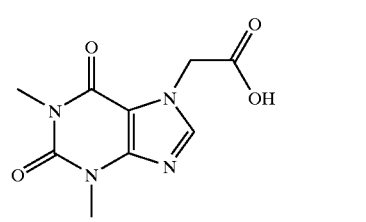

theophylline-7-acetic acid

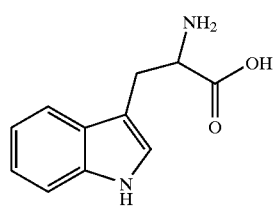

tryptophane

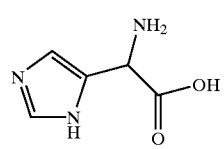

histidine

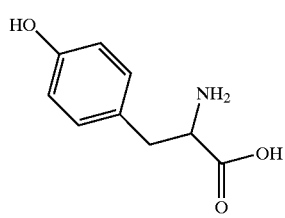

tyrosine

Further specific salt forming components (ii), which are selected from the group consisting of mono- or bicyclic carboxylic acids and phosphonic acids are illustrated by their structural formulae given below:

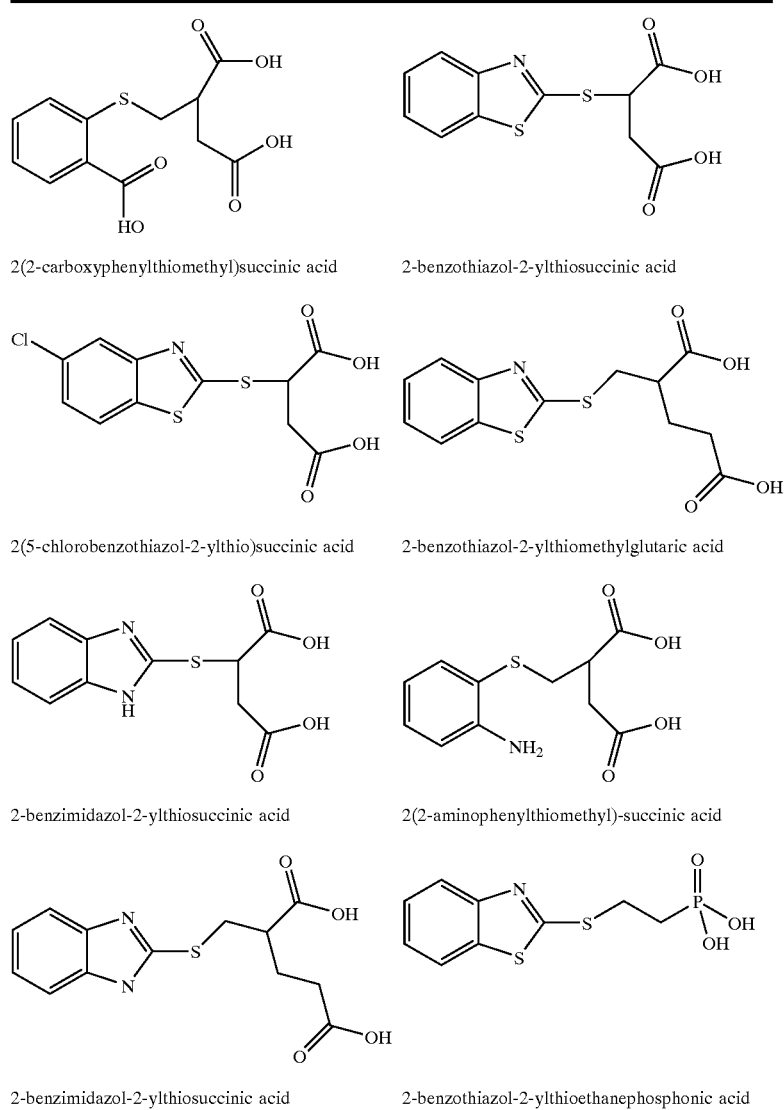

Preferred sulphonic acid-$C_1$–$C_4$alkyl esters suitable as salt forming component (ii) are the methyl or ethyl esters of the sulphonic acids mentioned above and illustrated by their structural formulae.

Preferred alkyl halides are the chlorides or bromides of $C_1$–$C_8$alkyl halides substituted with the above-mentioned mono-, bi- or tricyclic groups.

According to another embodiment of the invention the acidic group present in the salt forming component (ii), particularly the sulpho, carboxy or phosphono group, may be attached directly or with a bivalent bridge group to any aliphatic, cycloaliphatic, aliphatic cycloaliphatic, aromatic or aromatic aliphatic hydrocarbon backbone from a UV-absorber moiety.

Preferred bivalent groups are selected from the group consisting of —O—, —O—C(=O)—, —C(=O)—O—, —O($C_1$–$C_8$alkylene)- and $C_1$–$C_8$alkylene.

The term UV-light absorber moiety comprises any structural moiety effective as photo stable UV-filter which is derived from UV-light absorber compounds present in cosmetic and pharmaceutical preparations for protecting the human epidermis or human hair from UV-radiation, particularly in the range from 290 to 400 nm. Examples of suitable UV-light absorber moieties are described in U.S. Pat. No. 6,132,703. A preferred UV-light absorber moiety is a substituent selected from the group consisting of 2-(2'-hydroxyphenyl)benzotriazoles, 2-hydroxybenzophenones, benzoic acid esters, oxanilides and 2-(2-hydroxyphenyl)-1,3,5-triazines.

Specific 2-(2'-hydroxyphenyl)benzotriazoles are 2-(2'-hydroxy-5'-methylphenyl)-benzotriazole, 2-(2',4'-dihydroxyphenyl)-benzotriazole, 2-[3'-tert-butyl-2'-hydroxy-5-(1-hydroxycarbonyl-2-ethyl)-phenyl]-benzotriazole, 2-[3'-tert-butyl-2'-hydroxy-5-(1-hydroxycarbonyl-2-ethyl)-phenyl]-5-chlorobenzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)-phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'- octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)-benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyoxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazol-2-ylphenol]; the transesterification product of 2-[3'-tert-butyl-5'-(2-methoxy-carbonylethyl)-2'-hydroxyphenyl]-benzotriazole with polyethylene glycol 300; [R—CH$_2$CH$_2$—COO—CH$_2$CH$_2$-]$_2$; wherein R represents 3'-tert-butyl-4'-hydroxy-5'-2H-benzotriazol-2-yl-phenyl; 2-[2'-hydroxy-3'-(α,α-di-methylbenzyl)-5'-(1,1,3,3-tetramethylbutyl)phenyl]benzotriazole and 2-[2'-hydroxy-3'-(1,1,3,3-tetramethylbutyl)-5'-(α,α-dimethylbenzyl)phenyl]benzotriazole.

Specific 2-hydroxybenzophenones are, for example, the 4-hydroxy, 4-methoxy, 4-octyloxy, 4-decyloxy, 4-dodecyloxy, 4-benzyloxy, 2,4-dihydroxy, 4,2',4'-trihydroxy and 2'-hydroxy-4,4'-di-methoxy derivatives.

Specific benzoic acid esters are, for example, 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Specific oxanilides are, for example, 2-ethyl-2'-hydroxyoxanilide, 4,4'-dioctyloxyoxanilide, 2,2'-diethoxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide and mixtures of o- and p-methoxy- and of o- and p-ethoxy-disubstituted oxanilides.

Specific 2-(2-hydroxyphenyl)-1,3,5-triazines are, for example, 2,4-bis(biphenyl-4-yl)-6-(2,6-dihydroxy)-1,3,5-triazine, 2-(2,4-dihydroxyphenyl)-4,6-diphenyl1,3,5-triazine, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)-phenyl]-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-di-phenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

Particularly preferred are UV-light absorbers selected from the group consisting of (2,4di-hydroxyphenyl)-phenylmethanone, 2-benzotriazol-2-yl-4methylphenol, 4-benzotriazol-2-ylbenzene-1,3-diol, 3-[3-tert-butyl-5-(5-chlorobenzotriazol-2-yl)-4hydroxyphenyl]propionic acid, 3-[5-(benzotriazol-2-yl)-3-tert-butyl-4-hydroxyphenyl] propionic acid; 4-(4,6-di-phenyl)-1,3,5-triazin-2-yl-benzene1,3-diol, 4-[4,6-bis(biphenyl-4-yl)-1,3,5triazin-2-yl]-benzene-1,3-diol, 4-[4,6-di-(2,4-di-hydroxyphenyl)-1,3,5-triazin2-yl]benzene-1,3-diol and N'-2-ethylphenyl-N'-2-hydroxyphenyloxalamide.

In another preferred embodiment, the salt groups on the block copolymer are derived from the aminic structures of compound (III) by quaternisation with active alkyl halides or alkyl esters of organic sulphonic acids. In this case examples of preferred salt forming components (II) are benzylchloride, 2-chlorobenzylchloride, 4-chlorobenzylchloride, 2,4-dichlorobenzylchloride, p-toluene sulphonic acid methyl ester, p-toluene sulphonic acid ethyl ester and the methyl- or ethyl esters of the monocyclic, bicyclic or tricyclic sulphonic acids described before.

Component b)

Suitable dispersible organic pigments are selected from the group consisting of azo, disazo, naphthol, benzimidazolone, azocondensation, metal complex, isoindolinone, and isoindoline pigments, the chinophthalon pigment, dioxazine pigment and the polycyclic pigment group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, antanthrones, isoviolanthrones, diketopyrrolopyrrole, and carbazoles, e.g. carbazole violet, pigments, pearlescent flakes and the like. Further examples of organic pigments can be found in the monograph: W. Herbst, K. Hunger *Industrielle organische Pigmente* 2$^{nd}$ *Edition*, 1995, VCH Verlagsgesellschaft, ISBN: 3-527-28744-2.

Suitable dispersible inorganic pigments are selected from the group consisting of metallic flakes, such aluminium, aluminium oxide, calcium carbonate, silicon oxide and silicates, iron(III)oxide, chromium(III)oxide, titanium(IV) oxide, zirconium(IV)oxide, zinc oxide, zinc sulphide, zinc phosphate, mixed metal oxide phosphates, molybdenum sulphide, cadmium sulphide, carbon black or graphite, vanadates, such as bismuth vanadate, chromates, such as lead(IV)chromate, and molybdates, such as lead(IV) molybdate, and mixtures, crystal forms or modifications thereof, such as rutil, anatas, mica, talcum or kaolin.

The composition may contain in addition to component a)—polymer component—and component b)—pigments—conventional binding agents, e.g. for preparing coating compositions, e.g. paints, fillers, and other conventional additives selected from the group consisting of surfactants, stabilisers, UV-absorbers, HALS-stabilisers, anti-foaming agents, antioxidants, dyes, plasticisers, thixotropic agents, drying catalysts, anti-skinning agents and levelling agents.

The composition may also contain other conventional additives, such as antioxidants, light stabilisers, e.g. of the oxalamide or hydroxyphenyl-s-triazine type, flow control agents, rheology control agents, such as fumed silica, micro gels, screeners, quenchers or absorbers. These additives can be added individually or in mixtures.

The composition may contain the above-mentioned pigment component b) in an amount of 0.1 to 99.9% by weight, preferably 0.1 to 50.0% by weight and particularly preferably 1.0 to 30.0% by weight.

A particularly preferred embodiment of the invention relates to a composition comprising
a) 0.1–99.9% by weight of a combination of dispersing agents essentially consisting of
i) a block copolymer of the formula

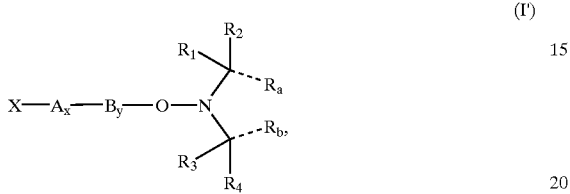

(I')

wherein
X represents a chain terminal group;
A and B represent different polymer blocks composed of non-ionic repeating units of ethylenically unsaturated monomers selected from the group consisting of styrenes, acrylic and methacrylic acid-$C_1$–$C_{24}$alkyl esters, acrylic and methacrylic acid-hydroxy-$C_2$–$C_6$alkyl esters, acrylic and methacrylic acid-dihydroxy-$C_3$–$C_4$alkyl esters and acrylic and methacrylic acid esters having poly-$C_2$–$C_4$alkylenegly-colester groups, wherein the ester groups may be substituted with $C_1$–$C_{24}$alkoxy groups; and wherein the repeating unit of an ethylenically unsaturated monomer substituted with an ionic group present in one of the polymer blocks A and B is represented by the cationic or anionic part of a salt formed from a compound of the formula $CH_2=C(R^1)-(C=O)-R^2$ (III),

wherein
$R^1$ represents hydrogen or $C_1$–$C_4$alkyl; and
$R^2$ represents —OH, $C_1$–$C_4$alkyl substituted by carboxy, sulpho or phosphono or amino substituted $C_2$–$C_{18}$alkoxy selected from the group consisting of amino-$C_2$–$C_{18}$alkoxy, $C_1$–$C_4$alkylamino-$C_2$–$C_{18}$alkoxy, di-$C_1$–$C_4$alkylamino-$C_2$–$C_{18}$alkoxy, hydroxy-$C_2$–$C_4$alkylamino-$C_2$–$C_{18}$alkoxy and $C_1$–$C_4$alkyl-(hydroxy-$C_2$–$C_4$alkyl)-amino-$C_2$–$C_{18}$alkoxy;
or wherein the repeating unit of an ethylenically unsaturated monomer substituted with an ionic group present in one of the polymer blocks A and B is the acid addition salt of an amino monomer selected from the group consisting of amino substituted styrene, $(C_1$–$C_4$alkyl$)_{1-2}$ amino substituted styrene, N-mono-$(C_1$–$C_4$alkyl$)_{1-2}$amino-$C_2$–$C_4$alkyl(meth) acrylamide and N, N-di-$(C_1$–$C_4$alkyl$)_{1-2}$ amino-$C_2$–$C_4$alkyl(meth)acrylamide;
x and y represent numerals greater than zero and define the number of monomer repeating units in polymer blocks A and B;
one of $R_1$ and $R_2$ represents $C_1$–$C_7$alkyl or hydroxy-$C_1$–$C_7$alkyl and the other one represents $C_1$–$C_4$alkyl or $C_1$–$C_4$alkyl substituted by $C_1$–$C_4$alkoxycarbonyl or $C_1$–$C_4$alkoxy or hydroxy-$C_1$–$C_7$alkyl; or
$R_1$ and $R_2$ together with the adjacent C-atom both represent $C_3$–$C_7$cycloalkyl;
$R_3$ and $R_4$ are independently as defined as $R_1$ and $R_2$ or —H;
$R_a$ represents hydrogen or a substituent selected from the group consisting of $C_1$–$C_4$alkyl, hydroxy-$C_1$–$C_4$alkyl, $C_5$–$C_{10}$aryl, $C_5$–$C_{10}$aryl-$C_1$–$C_4$alkyl, $C_1$–$C_4$alkyl-$C_5$–$C_{10}$aryl, cyano, $C_1$–$C_4$alkoxycarbonyl, $C_1$–$C_4$alkanoyloxy, $C_1$–$C_4$alkanoyloxy-$C_1$–$C_4$alkyl, carbamoyl, mono- or di- $C_1$–$C_4$alkylcarbamoyl, mono- or di-2-hydroxyethylcarbamoyl, amidino, 2-imidazolyl, 1-hydroxy-2-hydroxymethyl-2-propylcarbamoyl, 1,1-dihydroxymethyl-2-hydroxycarbamoyl and —P=O(O—$C_1$–$C_4$alkyl$)_2$; and
$R_b$ is as defined as $R_a$; or
$R_a$ and $R_b$ together represent a divalent group and form a 5-, 6-, 7- or 8-membered aliphatic or aromatic heterocyclic group, which may contain 1–3 additional heteroatoms selected from the group consisting of nitrogen, oxygen and sulphur; and
(ii) a salt forming component selected from the group consisting of mono-, bi- or tricyclic sulphonic, carboxylic and phosphonic acids, aliphatic sulphonic, carboxylic or phosphonic acids substituted with mono-, bi- or tricyclic groups; alkyl halides substituted with mono-, bi- or tricyclic groups, and $C_1$–$C_4$ alkyl esters or benzyl esters of mono-, bi- or tricyclic sulphonic acids, and
b) 0.1–99.9% by weight of dispersible inorganic or organic pigment particles.

A highly preferred embodiment of the invention relates to a composition comprising
a) 0.1–99.9% by weight of a combination of dispersing agents essentially consisting of
i) a block copolymer (I'),
wherein
X represents a chain terminal fragment;
one of the polymer blocks A and B is essentially composed of repeating units of ethylenically unsaturated monomers selected from the group consisting of styrenes, acrylic and methacrylic acid-$C_1$–$C_{24}$alkyl esters, acrylic and methacrylic acid-hydroxy-$C_2$–$C_6$alkyl esters, acrylic and methacrylic acid-dihydroxy-$C_3$–$C_4$alkyl esters, and acrylic and methacrylic acid esters having poly-$C_2$–$C_4$alkylenegly-colester groups, wherein the ester groups may be substituted with $C_1$–$C_{24}$alkoxy groups; and
wherein the repeating unit of an ethylenically unsaturated monomer substituted with an ionic group present in one of the polymer blocks A and B is represented by the cationic part of an acid addition salt, or the salt formed by quaternisation selected from the group consisting of 4-aminostyrene, 4-dimethylaminostyrene or aminoalkyl acrylate or methacrylate selected from the group consisting of 2-dimethylaminoethyl acrylate (DMAEA), 2-dimethylaminoethyl methacrylate (DMAEMA), 2-diethylaminoethyl acrylate (DEAEA), 2-diethylaminoethyl methacrylate (DEAEMA), 2-t- butylaminoethyl acrylate (t-BAEA), 2-t-butylaminoethyl methacrylate (t-BAEMA), 3-dimethylaminopropylmethacrylamide, 4-vinylpyridine, 2-vinylpyridine and 1-vinylimidazole;

x and y represent numerals greater than zero and define the number of monomer repeating units in polymer blocks A and B;

one of $R_1$ and $R_2$ represents methyl and the other one represents methyl or ethyl and one of $R_3$ and $R_4$ represents methyl and the other one represents methyl or ethyl; and $R_a$ and $R_b$ together represent a group of the partial formula

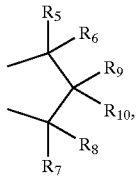
(D)

wherein
$R_5$, $R_6$, $R_7$ and $R_8$ independently of one another represent hydrogen, methyl or ethyl; and
one of $R_9$ and $R_{10}$ independently of the other represents hydrogen or substituents or $R_9$ and $R_{10}$ both represent substituents; and (ii) a salt forming component selected from the group consisting of mono-, bi- or tricyclic sulphonic, carboxylic and phosphonic acids, aliphatic sulphonic, carboxylic or phosphonic acids substituted with mono-, bi- or tricyclic groups, alkyl halides substituted with mono-, bi- or tricyclic groups, and $C_1$–$C_4$ alkyl esters or benzyl esters of mono-, bi- or tricyclic sulphonic acids; and b) 0.1–99.9% by weight of dispersible inorganic or organic pigment particles.

Another embodiment of the invention relates to the process for preparing the above-mentioned pigment dispersion, which comprises preparing the block copolymer (I) by copolymerising the fragments A and B by free radical polymerisation and α) modifying the block copolymer with the salt forming component, isolating and adding the modified block copolymer to dispersible pigment particles and optionally binder materials, fillers or other conventional additives; or β) modifying the block copolymer with the salt forming component in the presence of dispersible pigment particles and optionally binder materials, fillers or other conventional additives.

The method of free radical polymerisation that applies is the so-called living polymerisation with the >N—O—X' compounds (A) defined above (>N—O—R method). In the alternative, one of X and Y represents the fragment of one of a free radical initiator and the other one represents the chain terminal group from the free nitroxyl radical (B). The method of polymerisation that applies is the so-called living polymerisation with >N—O. compounds in the presence of the free radical initiators mentioned above.

The polymerisation process may be carried out in bulk or in the presence of water or an organic solvent or mixtures thereof. Additional co solvents or surfactants, such as glycols or ammonium salts of fatty acids, may be added to the reaction mixture. The amount of solvent should be kept as low as possible. The reaction mixture may contain the above-mentioned monomers or oligomers in an amount of 1.0 to 99.9% by weight, preferably 5.0 to 99.9% by weight, and especially preferably 50.0 to 99.9% by weight, based on the monomers present in the polymerisate.

If organic solvents are used, suitable solvents or mixtures of solvents are typically pure alkanes (hexane, heptane, octane, isooctane), hydrocarbons (benzene, toluene, xylene), halogenated hydrocarbons (chlorobenzene), alkanols (methanol, ethanol, ethylene glycol, ethylene glycol monomethyl ether), esters (ethyl acetate, propyl, butyl or hexyl acetate) and ethers (diethyl ether, dibutyl ether, ethylene glycol dimethyl ether, tetrahydrofuran, or mixtures thereof.

If water is used as a solvent the reaction mixture can be supplemented with a water-miscible or hydrophilic co solvent. The reaction mixture will then remain in a homogeneous single phase throughout the monomer conversion. Any water-soluble or water-miscible co solvent may be used, as long as the aqueous solvent medium is effective in providing a solvent system that prevents precipitation or phase separation of the reactants or polymer products until full completion of the polymerisation. Exemplary co solvents useful in the process may be selected from the group consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organosulphides, sulphoxides, sulphones, alcohol derivatives, hydroxyether derivatives such as butyl carbitol or cellosolve, amino alcohols, ketones, and the like, as well as derivatives and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof. When mixtures of water and water-soluble or water-miscible organic solvents are selected for the process, the water to co solvent weight ratio is typically in the range of about 100:0 to about 10:90.

When monomer mixtures or monomer/oligomer mixtures are used, the calculation of mol % is based on an average molecular weight of the mixture.

Hydrophilic monomers, polymers and copolymers of the present invention can be separated from one another or from the polymerisation reaction mixture by, for example, distillation, precipitation, extraction, changing the pH of the reaction media or by other well known conventional separation techniques.

The polymerisation temperature may range from about 50° C. to about 180° C., preferably from about 80° C. to about 150° C. At temperatures above about 180° C., the controlled conversion of the monomers into polymers may decrease, and undesirable by-products like thermally initiated polymers are formed or decomposition of the components may occur.

In an alternative embodiment of the process, the polymerisation is performed by employing the Atomic Transfer Radical Polymerisation (ATRP) method in the presence of a suitable catalyst capable of activating controlled radical polymerisation and the polymerisation initiator X—Y, which contains a radically transferable atom or group .X. Initiators of that type are described in WO 96/30421 and WO 98/01480. A preferred radically transferable atom or group .X is .Cl or .Br, which is cleaved as a radical from the initiator molecule and subsequently replaced after polymerisation as a leaving group with the >N→O compound (V) defined below.

Specific initiators are selected from the group consisting of α,α'-dichloro- or α,α'-dibromoxylene, p-toluene sulphonyl chloride (PTS), hexakis-(α-chloro- or α-bromomethyl)-benzene, 2-chloro- or 2-bromopropionic acid, 2-chloro- or 2-bromoisobutyric acid, 1-phenethyl chloride or bromide, methyl or ethyl 2-chloro- or 2-bromopropionate, ethyl-2-bromo- or ethyl-2-chloro-isobutyrate, chloro- or bromoacetonitrile, 2-chloro- or 2-bromopropionitrile, α-bromo-benzacetonitrile and α-bromo-γ-butyrolactone (=2-bromo-dihydro-2(3H)-furanone).

A suitable catalyst capable of activating controlled radical polymerisation is a transition metal complex catalyst salt is present as an oxidisable complex ion in the lower oxidation state of a redox system. Preferred examples of such redox systems are selected from the group consisting of Group V(B), VI(B), VII(B), VIII, IB and IIB elements, such as $Cu^+/Cu^{2+}$, $Cu^0/Cu^+$, $Fe^0/Fe^{2+}$, $Fe^{2+}/Fe^{3+}$, $Cr^{2+}/Cr^{3+}$, $Co^+/Co^{2+}$, $Co^{2+}/Co^{3+}$, $Ni^0/Ni^+$, $Ni^+/Ni^{2+}$, $Ni^{2+}/Ni^{3+}$, $Mn^0/Mn^{2+}$, $Mn^{2+}/Mn^{3+}$, $Mn^{3+}/Mn^{4+}$ or $Zn^+/Zn^{2+}$.

The ionic charges are counterbalanced by anionic ligands commonly known in complex chemistry of transition metals, such hydride ions ($H^-$) or anions derived from inorganic or organic acids, examples being halides, e.g. $F^-$, $Cl^-$, $Br^-$ or $I^-$, halogen complexes with transition metals, such as $Cu^1Br_2^-$, halogen complexes of the type $BF_4^-$, $PF_6^-$, $SbF_6^-$ or $AsF_6^-$, anions of oxygen acids, such as sulphate, phosphate, perchlorate, perbromate, periodate, antimonate, arsenate or nitrate, alcoholates or acetylides or anions of cyclopentadiene.

Anionic ligands and neutral may also be present up to the preferred coordination number of the complex cation, especially four, five or six. Additional negative charges are counterbalanced by cations, especially monovalent cations such as $Na^+$, $K^+$, $NH_4^+$ or $(C_1-C_4alkyl)_4N^+$.

Suitable neutral ligands are inorganic or organic neutral ligands commonly known in complex chemistry of transition metals. They coordinate to the metal ion through a σ-, π-, μ-, η-type bonding or any combinations thereof up to the preferred coordination number of the complex cation. Suitable inorganic ligands are selected from the group consisting of aquo ($H_2O$), amino, nitrogen, carbon monoxide and nitrosyl. Suitable organic ligands are selected from the group consisting of phosphines, e.g. $(C_6H_5)_3P$, $(i-C_3H_7)_3P$, $(C_5H_9)_3P$ or $(C_6H_{11})_3P$, di-, tri-, tetra- and hydroxyamines, such as ethylenediamine, ethylenediaminotetraacetate (EDTA), N,N-Dimethyl-N',N'-bis(2-dimethylaminoethyl)-ethylenediamine ($Me_6TREN$), catechol, N,N'-dimethyl-1,2-benzenediamine, 2-(methylamino)phenol, 3-(methylamino)-2-butanol or N,N'-bis(1,1-dimethylethyl)-1,2-ethanediamine, N,N,N',N'',N''-pentamethyldiethyltriamine (PMDETA), $C_1-C_8$-glycols or glycerides, e.g. ethylene or propylene glycol or derivatives thereof, e.g. di-, tri- or tetraglyme, and monodentate or bidentate heterocyclic $e^-$ donor ligands.

The oxidisable transition metal complex catalyst can be formed in a separate preliminary reaction step from its ligands or is preferably formed in-situ from its transition metal salt, e.g. Cu(I)Cl, which is then converted to the complex compound by addition of compounds corresponding to the ligands present in the complex catalyst, e.g. by addition of ethylenediamine, EDTA, $Me_6TREN$ or PMDETA.

The various advantages of a polymerisation process of this type allowing flexible polymerisation reactions are described by K. Matyjaszewski in *ACS Symp. Ser.* Vol. 685 (1998), pg. 2–30.

After completing the polymerising step process, the polymers obtained may be isolated or the >N→O compound of the formula:

which corresponds to the group $A_0$ and wherein $R_1$–$R_4$ and $R_a$ and $R_b$ are as defined above, is added in-situ. The isolating step of the present process may be carried out by known procedures, e.g. by distilling and filtering off unreacted monomer. After completing the substitution of the polymerisate with the >N→O compound (V), the catalyst salt is filtered off, followed by evaporation of the solvent or by precipitation of the >N→O polymer (I) in a suitable liquid phase, filtering the precipitated polymer and washing and drying.

The elimination of the leaving group —X, e.g. halogen, and the substitution of the polymerisate with the >N→O compound (V) is advantageously performed in such a way that the polymerisate is dissolved in a solvent and the >N→O compound (V) is added. The reaction takes place within a temperature range from room temperature to the boiling temperature of the reaction mixture, preferably from room temperature to 100° C. The transition metal in the oxidisable transition metal complex catalyst salt is converted from its lower oxidation state in the above-mentioned redox systems to its higher oxidation state. In a preferred embodiment of that process a Cu(I) complex catalyst salt is converted to the corresponding Cu(II) oxidation state.

Because the present polymerisation is a "living" polymerisation, it can be started and terminated practically at will. The block copolymers (I) as obtained by the process defined above have a low polydispersity. Preferably the polydispersity is from 1.01 to 2.2, more preferably from 1.01 to 1.9, and most preferably from 1.01 to 1.5.

According to the process variant a) the block copolymer (I) is modified by addition of the salt forming component (ii) defined above, and isolating the modified block copolymer (I) in pure form or as a solution or dispersion in water or an organic solvent or a mixture of both. The modified block copolymer is then added in pure form or as a solution or dispersion to dispersible pigment particles and optionally binder materials, fillers or other conventional additives.

In an alternative embodiment of the process the polymers or copolymers can be further processed and used in most cases without any further purification step. This is an important advantage when industrial scale-up is intended. According to the process variant β) the block copolymer (I) is modified with the salt forming component (ii) in the presence of dispersible pigment particles and optionally binder materials, fillers or other conventional additives. A separate mixture of the salt forming component (ii), dispersible pigment particles and the optional components, such as binder materials, fillers or other conventional additives, e.g. solvent, is prepared to which the block copolymer (I) is added.

The sequential order of performing the individual mixing steps comprising the block copolymer (I), the salt forming component (ii) and the optional components of the composition is non-critical according to the process of above.

The pigments are added to the polymer dispersant by using conventional techniques, such as high speed mixing, ball milling, sand grinding, attritor grinding or two or three roll milling. The resulting pigment dispersion may have a pigment to dispersant binder weight ratio of about 0.1:100.0 to 1500.0:100.0.

The organic solvents present in the dispersion are mentioned above, cf. process, and preferably are commonly used solvents in coatings technology. For water based coatings applications, aside from water, preferably polar, water-miscible solvents such as $C_1$–$C_4$alkohols, e.g. methanol, ethanol, or isopropanol, glycol ethers like butyl glycol, or methoxypropylene glycol, polyols, e.g. glycerol, or ethylene, diethylene, triethylene, triethylene or propylene glycol are used. For solvent based coating systems, preferably less polar solvents like aliphatic hydrocarbons, esters like n-butyl acetate, or glycol ethers like methoxypropylene glycol or glycol ether esters like methoxypropylene glycol acetate are used.

In another preferred embodiment of the process variants α) or β), fine pigment dispersions are prepared by mixing the pigments with a solution of the polymers or an aqueous emulsion of the polymers, concentrating the resulting mixture by distilling off the solvents and/or water, preferably to dryness, and optionally further subjecting the resulting concentrate to thermal and/or mechanical treatment to prepare a mixture comprising pigments and polymers which may then be subsequently dispersed in aqueous and/or organic solvents. According to this process, the solid composition of pigment and modified block copolymer is easy to disperse and does not require time and energy intensive grinding to be incorporated into e.g. a paint formulation.

The above-mentioned methods for preparing the composition, such as high speed mixing, ball milling, sand grinding, attritor grinding or two or three roll milling may in the alternative be employed when preparing the dispersion.

The present invention also relates to the use of the pigment dispersion described above for preparing coating compositions, prints, images, inks, lacquers, pigmented plastics, adhesives, casting resins, filled composites, glass fibre reinforced composites, laminates, cement based construction materials like plaster and tile adhesives. Likewise of particular interest is a specific embodiment of the above-mentioned process for preparing the dispersion, wherein coating compositions, for example paints, are prepared. The invention therefore also relates to compositions, wherein film-forming binders c) for coatings are added to the composition comprising components a) and b) described above.

The novel coating composition preferably comprises 0.01–100.0 parts by weight of the combined components a) and b) in the composition, in particular 0.05–50.0 parts, especially 0.1–20.0 parts, per 100.0 parts by weight of solid binder c).

The binder c) can in principle be any binders which are customary in industry, for example those described in *Ullmann's Encyclopedia of Industrial Chemistry*, 5th Edition, Vol. A 18, pp. 368–426, VCH, Weinheim 1991, Germany. In general, the film-forming binder is based on a thermoplastic or thermosetting resin, predominantly on a thermosetting resin. Examples thereof are alkyd, acrylic, polyester, phenolic, melamine, epoxy and polyurethane resins and mixtures thereof. Also resins curable by radiation or air-drying resins can be used.

Component c) can be any cold-curable or hot-curable binder. The addition of a curing catalyst may be advantageous. Suitable catalysts that accelerate the curing of the binder are described, for example, in *Ullmann's*, Vol. A18, p.469.

Preference is given to coating compositions in which component c) is a binder comprising a functional acrylate resin and a cross linking agent. Examples of coating compositions containing specific binders are:

1) Paints based on cold- or hot cross linkable alkyd, acrylate, polyester, epoxy or melamine resins or mixtures of such resins, if desired with addition of a curing catalyst;
2) Two-component polyurethane paints based on hydroxyl-containing acrylate, polyester or polyether resins and aliphatic or aromatic isocyanates, isocyanurates or polyisocyanates;
3) One-component polyurethane paints based on blocked isocyanates, isocyanurates or polyisocyanates which are deblocked during baking, if desired with addition of a melamine resin;
4) One-component polyurethane paints based on a tris-alkoxycarbonyl triazine cross linker and a hydroxyl group containing resin such as acrylate, polyester or polyether resins;
5) One-component polyurethane paints based on aliphatic or aromatic urethane acrylates or polyurethane acrylates having free amino groups within the urethane structure and melamine resins or polyether resins, if necessary with curing catalyst;
6) Two-component paints based on (poly)ketimines and aliphatic or aromatic isocyanates, isocyanurates or polyisocyanates;
7) Two-component paints based on (poly)ketimines and an unsaturated acrylate resin or a polyaceto acetate resin or a methacrylamidoglycolate methyl ester;
8) Two-component paints based on carboxyl- or amino-containing polyacrylates and polyepoxides;
9) Two-component paints based on acrylate resins containing anhydride groups and on a polyhydroxy or polyamino component;
10) Two-component paints based on acrylate-containing anhydrides and polyepoxides;
11) Two-component paints based on (poly)oxazolines and acrylate resins containing anhydride groups, or unsaturated acrylate resins, or aliphatic or aromatic isocyanates, isocyanurates or polyisocyanates;
12) Two-component paints based on unsaturated polyacrylates and polymalonates;
13) Thermoplastic polyacrylate paints based on thermoplastic acrylate resins or externally cross linking acrylate resins in combination with etherified melamine resins;
14) Paint systems based on siloxane-modified or fluorine-modified acrylate resins.

In addition to the components mentioned above, the coating composition according to the invention preferably comprises a light stabiliser of the sterically hindered amine type, the 2-(2-hydroxyphenyl)-1,3,5-triazine and/or the 2-hydroxyphenyl-2H-benzotriazole types. Further examples for light stabilisers of the 2-(2-hydroxyphenyl)-1,3,5-triazine type advantageously to be added can be found e.g. in the published patent literature, e.g. U.S. Pat. No. 4,619,956, EP-A-0 434 608, U.S. Pat. No. 5,198,498, U.S. Pat. No. 5,322,868, U.S. Pat. No. 5,369,140, U.S. Pat. No. 5,298,067, WO-94/18278, EP-A-0 704 437, GB-A-2 297 091, WO-96/2843 1. Of special technical interest is the addition of the 2-(2-hydroxyphenyl)-1,3,5-triazines and/or 2-hydroxyphenyl-2Hbenzo-triazoles, especially the 2-(2-hydroxyphenyl)-1,3,5-triazines.

Apart from the components mentioned above, the coating composition can also comprise further components, examples being solvents, pigments, dyes, plasticisers, stabilisers, thixotropic agents, drying catalysts and/or levelling agents. Examples of possible components are those described in *Ullmann's,* Vol. A 18, pp. 429–471.

Possible drying catalysts or curing catalysts are, for example, organometallic compounds, amines, amino-containing resins and/or phosphines. Examples of organometallic compounds are metal carboxylates, especially those of the metals Pb, Mn, Co, Zn, Zr or Cu, or metal chelates, especially those of the metals Al, Ti or Zr, or organometallic compounds such as organotin compounds.

Examples of metal carboxylates are the stearates of Pb, Mn or Zn, the octanoates of Co, Zn or Cu, the naphthenoates of Mn and Co or the corresponding linoleates, resinates or tallates.

Examples of metal chelates are the aluminium, titanium or zirconium chelates of acetyl acetone, ethyl acetyl acetate, salicylaldehyde, salicylaldoxime, o-hydroxyacetophenone or ethyl trifluoroacetyl acetate, and the alkoxides of these metals.

Examples of organotin compounds are dibutyltin oxide, dibutyltin dilaurate or dibutyltin dioctoate.

Examples of amines are, in particular, tertiary amines, for example tributylamine, triethanolamine, N-methyidiethanolamine, N-dimethylethanolamine, N-ethylmorpholine, N-methylmorpholine or diazabicyclooctane (triethylenediamine) and salts thereof. Further examples are quaternary ammonium salts, for example trimethylbenzylammonium chloride.

Amino-containing resins are simultaneously binder and curing catalyst. Examples thereof are amino-containing acrylate copolymers.

The curing catalyst used can also be a phosphine, for example triphenylphosphine.

The novel coating compositions can also be radiation-curable coating compositions. In this case, the binder essentially comprises monomeric or oligomeric compounds containing ethylenically unsaturated bonds, which after application are cured by actinic radiation, i.e. converted into a crosslinked, high molecular weight form. Where the system is UV-curing, it generally contains a photoinitiator as well. Corresponding systems are described in the above-mentioned publication *Ullmann's,* Vol. A 18, pages 451–453. In radiation-curable coating compositions, the novel stabilisers can also be employed without the addition of sterically hindered amines.

The coating compositions according to the invention can be applied to any desired substrates, for example to metal, wood, plastic or ceramic materials. They are preferably used as topcoat in the finishing of automobiles. If the topcoat comprises two layers, of which the lower layer is pigmented and the upper layer is not pigmented, the novel coating composition can be used for either the upper or the lower layer or for both layers, but preferably for the upper layer.

The novel coating compositions can be applied to the substrates by the customary methods, for example by brushing, spraying, pouring, dipping or electrophoresis; see also *Ullmann's,* Vol. A 18, pp. 491–500.

Depending on the binder system, the coatings can be cured at room temperature or by heating. The coatings are preferably cured at 50–150° C., and in the case of powder coatings or coil coatings even at higher temperatures.

The coatings obtained in accordance with the invention have excellent resistance to the damaging effects of light, oxygen and heat; particular mention should be made of the good light stability and weathering resistance of the coatings thus obtained, for example paints.

The invention therefore also relates to a coating, in particular a paint, which has been stabilised against the damaging effects of light, oxygen and heat by a content of the compound of the formula (I) according to the invention. The paint is preferably a topcoat for automobiles. The invention furthermore relates to a process for stabilising a coating based on organic polymers against damage by light, oxygen and/or heat, which comprises mixing with the coating composition a mixture comprising a compound of the formula (I), and to the use of mixtures comprising a compound of the formula (I) in coating compositions as stabilisers against damage by light, oxygen and/or heat.

The coating compositions can comprise an organic solvent or solvent mixture in which the binder is soluble. The coating composition can otherwise be an aqueous solution or dispersion. The vehicle can also be a mixture of organic solvent and water. The coating composition may be high-solids paint or can be solvent-free (e.g. a powder coating material). Powder coatings are, for example, those described in *Ullmann's,* A18, pages 438–444. The powder coating material may also have the form of a powder-slurry (dispersion of the powder preferably in water).

Likewise preferred is the use of the coating composition as a topcoat for applications in the automobile industry, especially as a pigmented or unpigmented topcoat of the paint finish. Its use for underlying coats, however, is also possible.

The above-mentioned coating compositions or disperse systems may additionally contain fillers, such as calcium carbonate, silicates, glass fibres, glass beads, talc, kaolin, mica, barium sulphate, metal oxides and hydroxides, carbon black, graphite, wood powders, powders and fibres of other natural products, synthetic fibres, plasticisers, lubricants, emulsifiers, pigments, rheology additives, catalysts, flow auxiliaries, optical brighteners, flame retardants, antistatics, blowing agents.

The following examples illustrate the invention.

EXAMPLES

Dispersions and Pigmented Coatings Containing Block Copolymers Prepared by Free Radical Polymerisation with >NO—R initiators 1.1 Preparation of Polymers 1.1.1 Preparation of Poly-n-butyl Acrylate 200° g (1.56 mol) n-butyl acrylate (Fluka purum 99%) and 9.07 g (29.7 mmol) of the initiator

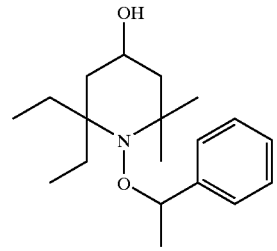

(prepared according GB-A 2 335 190) are added to a 400 ml reactor equipped with a mechanical stirrer. The air is removed from the flask by stirring and evacuating and rinsing with nitrogen 3 times. The clear solution obtained is heated up to 145° C. in an oil bath. After carrying out the polymerisation for 4 h the reaction mixture is cooled to 60° C. Remaining monomers are removed by evaporation with high vacuum. 154 g (77%) of the initial monomer have reacted. A clear yellow viscous fluid is obtained.

GPC (THF/PS standards): $M_n$: 5250 (calc.: 5190), $M_w$: 6500; Polydispersity: 1.2.

1.1.2 Preparation of a Block Copolymer of n-butyl Acrylate and 2-dimethylaminoethyl Methacrylate (DMAEMA): Polymer 1

80° g poly-n-butyl acrylate, prepared as described above (1.1.1) and 80 g (0.558 mol) 2-dimethylaminoethyl methacrylate (Aldrich 98%) are added to a 200 ml reactor equipped with a mechanical stirrer. The air is removed from the flask by stirring and evacuating and rinsing with nitrogen 3 times. The mixture is stirred, heated up to 145° C. and polymerised for 2 hours. The reaction mixture is cooled and the polymer is isolated by drying with high vacuum. 96 g (60%) of a viscous orange polymer is obtained.

GPC (THF/PS-standards): $M_n$: 6400 (calc.: 6400), $M_w$: 8200, PDI: 1.3.

1.1.3 Preparation of Poly-n-butyl Acrylate

Poly-n-butyl acrylate is obtained in a manner analogous to 1.1.1 by polymerising 1000 g (7.8 mol) n-butyl acrylate in the presence of 22.714 g (63 mmol) of the initiator

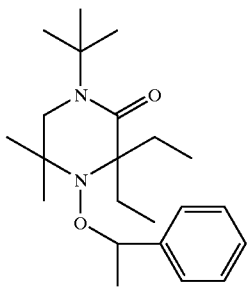

(prepared according to GB-A-2 342 649). 900 g (90%) of the initial monomer have reacted. A clear yellow viscous fluid is obtained.

GPC (THF/PS standards): $M_n$: 10,000 (calc.: 12,500), $M_w$: 12,000; Polydispersity: 1.2.

1.1.4 Preparation of a Block Copolymer of N-butyl Acrylate and 2-dimethylaminoethyl Acrylate (DMAEA): Polymer 2

The block copolymer is obtained in a manner analogous to 1.1.2 by polymerising 600.0 g poly(n-butyl acrylate) with 600.0 g (1.46 mol) DMAEA (Ageflex® FA1). 900 g (75%) of a viscous, yellow polymer is obtained.

GPC (THF/PS-standards): $M_n$: 8800 (calc.: 14,900), $M_w$: 13,200, PDI: 1.5.

1.1.5 Preparation of Poly-n-butyl Acrylate

Poly-n-butyl acrylate is obtained in a manner analogous to 1.1.1 by polymerising 1000 g (7.8 mol) n-butyl acrylate in the presence of 33.84 g (93.6 mmol) of the initiator

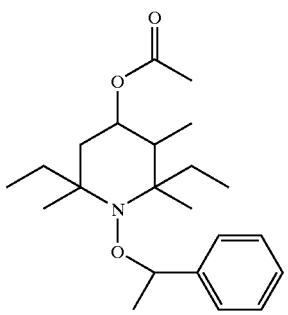

(prepared according to GB-2 335 190). 820 g (82%) of the initial monomer have reacted. A clear yellow viscous fluid is obtained.

GPC (THF/PS standards): $M_n$: 8500 (calc.: 8750), $M_w$: 11,250; Polydispersity: 1.3.

1.1.6 Preparation of a Block Copolymer of N-butyl Acrylate and 2-dimethylaminoethyl Acrylate (DMAEA): Polymer 3

The block copolymer is obtained in a manner analogous to 1.1.2 by polymerising 600.0 g poly(n-butyl acrylate) with 600.0 g (1.46 mol) DMAEA (Ageflex® FA1). 800 g (66.6%) of a viscous, yellow polymer is obtained.

GPC (THF/PS-standards): $M_n$: 7700 (calc.: 11,300), $M_w$: 12,320, PDI: 1.6.

1.1.7 Preparation of Poly-n-butyl Acrylate

Poly-n-butyl acrylate is prepared in a manner analogous to 1.1.1 by polymerising 1750 g n-butyl acrylate in the presence of 47.7 g of the initiator

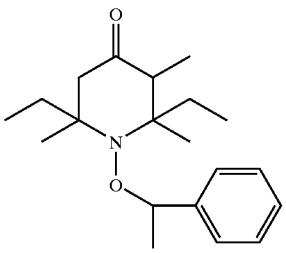

(prepared according to GB-A 2 335 190). 1355 g of product are obtained as a viscous oil (75% conversion).

GPC: $M_n$: 8650, PDI: 1.2.

1.1.8 Preparation of a Block Copolymer of N-butyl Acrylate and DMAEA: Polymer 4

The block copolymer is obtained in a manner analogous to 1.1.2 by polymerising 1355.3 g poly(n-butyl acrylate) of Example 1.1.8 with 950 g DMAEA. 1784 g of dried product are received as brown viscous oil.

GPC: $M_n$: 9037, PDI: 1.3; content of DMAEA: 23% wt ($^1$H-NMR); $N_2$-content: 2.51% wt (elemental analysis).

For further use, the polymer is dissolved in a 50:50 mixture of Shellsol® D40 and butyl acetate (60% solids).

1.1.9 Preparation of Poly-n-butyl Acrylate

Poly-n-butyl acrylate is prepared in a manner analogous to 1.1.4 with the NOR-initiator from 1.17.

GPC: $M_n$: 12850, PDI: 1.3.

1.1.10 Preparation of a Block Copolymer of N-butyl Acrylate and DMAEA: Polymer 4

The block copolymer is obtained in a manner analogous to 1.1.4 by polymerising 100 g poly(n-butyl acrylate) of Example 1.1.9 with 100 g DMAEA for 30 min at 145° C. After removal of the unreacted monomer 113 g of dried product are obtained as brown viscous oil.

Content of DMAEA: 11% wt ($^1$H-NMR); $N_2$-content: 1.33% wt (elemental analysis).

For further use, the polymer is dissolved in n-butyl acetate (60% solids)

1.2. Preparation of Polymers with Acid Addition Salt Forming Component 1.2.1 Preparation of a Block Copolymer of N-butyl Acrylate and 2-dimethylaminoethyl Acrylate (DMAEA) Modified with a Carboxylic Acid as the Acid Addition Salt Forming Component.

25.0 g of the block copolymer of n-butyl acrylate and 2-dimethylaminoethyl acrylate (1.1.6) and 78.54 g propylene glycol monomethyl ether are mixed in a 250 ml round flask equipped with a magnetic stirrer. The yellow mixture is stirred at 80° C. until it is homogeneous and 15.94 g 3-(2H-benzotriazol-2-yl)-5-sec-butyl-4-hydroxybenzene-sulphonic acid

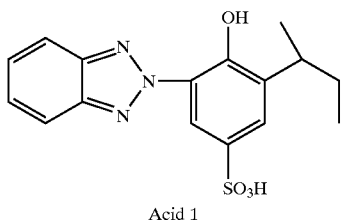

Acid 1 are added at once. The reaction mixture is stirred for 3 hours at 80° C., cooled to room temperature and filtered.

1.2.2 Preparation of a Block Copolymer of N-butyl Acrylate and 2-dimethylaminoethyl Acrylate (DMAEA) Modified with a Sulphonic Acid as the Acid Addition Salt Forming Component 25.0 g of block copolymer of n-butyl acrylate and 2-dimethylaminoethyl acrylate (1.1.6) are converted in a manner analogous to 1.2.1 to the acid addition salt by adding 8.66 g 1-(benzothiazol-2-ylthio)-succinic acid:

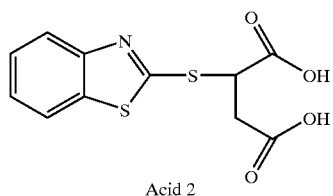

Acid 2

1.2.3 Preparation of block copolymers of n-butyl acrylate and 2-dimethylaminoethyl acrylate (DMAEA) or block copolymers of n-butyl acrylate and 2-dimethylaminoethyl methacrylate (DMAEMA) modified with other acids. According to the process β), Polymer 2 (Example 1.1.4) is modified in the millbase in the presence of pigment with different acids. Table 1 shows the structure of the different acids used as addition salt forming components:

TABLE 1

| Example | Acid |
|---|---|
| 1.2.3.1 | Acid 3 Uvinul ® MS40 |
| 1.2.3.2 | Acid 4 |

TABLE 1-continued

| Example | Acid |
|---|---|
| 1.2.3.3 | Acid 5 |
| 1.2.3.4 | Acid 6 |
| 1.2.3.5 | Acid 7 |
| 1.2.3.6 | Acid 8 |
| 1.2.3.7 | Acid 9 |
| 1.2.3.8 | Acid 10 |
| 1.2.3.9 | Acid 11 |

TABLE 1-continued

| Example | Acid |
|---|---|
| 1.2.3.10 | Acid 12 (benzimidazole-2-thio succinic acid structure) |
| 1.2.3.11 | Acid 13 (2-aminophenylthio methyl succinic acid structure) |
| 1.2.3.12 | Acid 14 (2-carboxyphenylthio methyl succinic acid structure) |

1.2.4 Preparation of Modified Copolymers of N-butyl Acrylate and DMAEA

According to the process β), Polymer 4 (1.1.8) and Polymer 5 (1.1.10) are modified with different acids in the millbase in the presence of pigment. Table 2 shows the structure of the different acids used as addition salt forming components:

TABLE 2

| | |
|---|---|
| 1.2.4.1 | Acid 15 (2,4-dichlorophenoxyacetic acid) |
| 1.2.5.2 | Acid 16 (caffeine-8-acetic acid / theophylline acetic acid structure) |
| 1.2.5.3 | Acid 17 (trimellitic anhydride) |

2. Preparation and Testing of Pigment Dispersions Containing Modified Block Copolymers The performance of the different block copolymers modified with the acid addition salt components is evaluated in millbase preparations and corresponding coating formulations made therefrom.

2.1 Preparation and Testing of the Millbase:

A polyester millbase formulation is prepared according to the following prescription:

| | |
|---|---|
| Dynapol ® H700-08 | 11.99 g |
| Pigment | 9.60 g |
| Dispersant (60% active) | 3.20 g |
| Xylene/n-butyl acetate 40/60 | 55.21 g |
| Total | 80.00 g |

Dependent on the active content of the different dispersants used and optional additions of acids, the formulation is slightly adjusted by solvents and DYNAPOL resin in order to adjust a pigment binder ratio of about 1. The components are ground with glass beads on a shaking machine (DIN 53238-13) for 4 hours. The viscosity of the millbase after grinding is measured at different shear rates with a cone-plate rheometer (Paar Physica UDS 200). Good dispersant efficiency can be seen by lowering of the millbase viscosity especially at mid to low shear rates, e.g. at a shear rate of 16. Two different processes for the preparation of the millbase are used:

Process α)

The modified block copolymer dispersant is prepared separately in form of a concentrate additive solution. This additive solution is added together with the other components of the millbase and then ground for 4 hours.

Process β)

The aminic block copolymer and the corresponding acids are added separately to the other components of the millbase and then ground for 4 h. In this case, the modified block copolymer is formed "in situ" during the grinding of the millbase.

3. Preparation and Testing of a Full Shade Coating of Type Polyester/Melamine/CAB Full shade formulations with a pigment content of 5% are made from the polyester-millbase according to the following general prescription:

| | |
|---|---|
| Millbase | 30.00 g |
| Dynapol ® H700-08 | 12.42 g |
| CAB 531.1 | 18.97 g |
| Maprenal ® MF650 | 2.12 g |
| O/S Zirconium 6 | 0.36 g |
| Xylene/n-butyl acetate 40/60 | 8.13 g |
| Total | 72.00 g |

The full shade formulation is drawn down on glass, dried at room temperature and then cured at 130° C. for 30 min.

Gloss measurements are made on the cured coatings. High gloss is indicative for a good dispersion of the pigment in the final coating.

4. Results

Table 3 shows the results of application tests of comparative formulations with block copolymers and formulations with modified block copolymers as well as the composition of the dispersants. Application results are based on the pigment Iragazin® Rubine TR in a coating system polyester/melamine/CAB.

Table 4 shows the results with modified block copolymers tested in an alkyd/melamine coating system with the pigment Irgazin® DPP Red BTR. In comparison with the references, the formulations containing the modified block copolymers exhibit lower viscosities of the millbase and improved gloss in the cured coating.

TABLE 3

Application Results with IRGAZIN RUBINE TR in Coating System Polyester/Melamine/CAB

| Ex. | Dispersant Composition[1] | Polymer Tested | Molecular Weight GPC[2] | Modifying Agent | Process Type/ theor. Degree of Neutralisation | Millbase % Block Co-polymer[3] | % Modifier[3] | Viscosity Millbase at Shear Rate: 1 | 16 | 128 | 1024 | Full Shade Coating Gloss 20° |
|---|---|---|---|---|---|---|---|---|---|---|---|---|
| 1 | P(BA-b-DMAEMA) 77-23 | Polymer 1 | Mw = 8200/Mn = 6400/PD = 1.3 | — | α | 20.0 | — | 11700 | 5440 | 1020 | 166 | 20 |
| 2 | P(BA-b-DMAEA) 74-26 | Polymer 2 | Mw = 13200/Mn = 8800/PD = 1.5 | — | α | 20.0 | — | 1550 | 173 | 38 | 13 | 12 |
| 5 | P(BA-b-DMAEMA) 80-20 | Polymer 1 | Mw = 8200/Mn = 6400/PD = 1.3 | Acid 1 | β >> 105% | 13.0 | 7.0 | 5710 | 575 | 105 | 27 | 68 |
| 6 | P(BA-b-DMAEA) 74-26 | Polymer 2 | Mw = 13200/Mn = 8800/PD = 1.5 | Acid 1 | β >> 110% | 11.8 | 8.2 | 4240 | 407 | 86 | 25 | 68 |
| 7 | P(BA-b-DMAEA) 74-26 | Polymer 2 | Mw = 13200/Mn = 8800/PD = 1.5 | Acid 4 | β >> 66% | 20.0 | 5.8 | 23600 | 5690 | 947 | 163 | 64 |
| 8 | P(BA-b-DMAEA) 74-26 | Polymer 2 | Mw = 13200/Mn = 8800/PD = 1.5 | Acid 5 | β >> 66% | 20.0 | 2.2 | 21800 | 2950 | 471 | 87 | 72 |
| 9 | P(BA-b-DMAEA) 74-26 | Polymer 2 | Mw = 13200/Mn = 8800/PD = 1.5 | Acid 6 | β >> 66% | 20.0 | 4.2 | 18300 | 2080 | 329 | 64 | 80 |
| 10 | P(BA-b-DMAEA) 74-26 | Polymer 2 | Mw = 13200/Mn = 8800/PD = 1.5 | Acid 7 | β >> 66% | 20.0 | 3.7 | 24000 | 3160 | 498 | 90 | 73 |
| 11 | P(BA-b-DMAEA) 74-26 | Polymer 2 | Mw = 13200/Mn = 8800/PD = 1.5 | Acid 8 | β >> 66% | 20.0 | 2.4 | 21300 | 2410 | 349 | 64 | 65 |
| 12 | P(BA-b-DMAEA) 74-26 | Polymer 2 | Mw = 13200/Mn = 8800/PD = 1.5 | Acid 9 | β >> 66% | 20.0 | 2.8 | 22300 | 3280 | 510 | 91 | 61 |
| 13 | P(BA-b-DMAEA) 74-26 | Polymer 2 | Mw = 13200/Mn = 8800/PD = 1.5 | Acid 10 | β >> 66% | 20.0 | 4.0 | 18800 | 2290 | 298 | 58 | 76 |
| 14 | P(BA-b-DMAEA) 74-26 | Polymer 2 | Mw = 13200/Mn = 8800/PD = 1.5 | Acid 11 | β >> 66% | 20.0 | 6.3 | 13600 | 2620 | 453 | 82 | 76 |
| 15 | P(BA-b-DMAEA) 74-26 | Polymer 2 | Mw = 13200/Mn = 8800/PD = 1.5 | Acid 12 | β >> 66% | 20.0 | 7.0 | 24500 | 3380 | 540 | 98 | 68 |
| 16 | P(BA-b-DMAEA) 74-26 | Polymer 2 | Mw = 13200/Mn = 8800/PD = 1.5 | Acid 13 | β >> 66% | 20.0 | 3.4 | 23500 | 3340 | 517 | 92 | 61 |
| 17 | P(BA-b-DMAEA) 74-26 | Polymer 2 | Mw = 1320/Mn = 8800/PD = 1.5 | Acid 14 | β >> 66% | 20.0 | 3.7 | 26600 | 4480 | 704 | 123 | 71 |
| 18 | P(BA-b-DMAEA) 74-26 | Polymer 2 | Mw = 13200/Mn = 8800/PD = 1.5 | Acid 3 | β >> 66% | 20.0 | 3.7 | 17800 | 2110 | 341 | 67 | 76 |
| 25 | P(BA-b-DMAEA) 65-35 | Polymer 3 | Mw = 12320/Mn = 7700/PD = 1.6 | Acid 2 | α >> 100% | 14.9 | 5.2 | 22500 | 2710 | 397 | 76 | 44 |
| 26 | P(BA-b-DMAEA) 65-35 | Polymer 3 | Mw = 12320/Mn = 7700/PD = 1.6 | Acid 1 | α >> 75% | 12.2 | 7.8 | 14300 | 1360 | 209 | 50 | 55 |

[1] monomer composition given in wt %; BA = butyl acrylate, DMAEMA = 2-dimethylaminoethyl methacrylate, DMAEA = 2-dimethylaminoethyl acrylate
[2] molecular weights determined on the non modified block copolymers
[3] concentration of block copolymer and modifier is relative to the pigment The "modified block copolymers" in Examples 5 to 26 show better performance as compared with the state of the art block copolymer dispersants made by controlled free radical polymerisation. Gloss is higher and/or viscosity (especially at shear rate 16) is lower compared to the comparative examples.

TABLE 4

Application Results with IRGAZIN DPP Red BTR in Coating System Alkyd/Melamine

| Ex. | Dispersant Composition[1] | Dispersant Polymer Tested | Dispersant Molecular Weight GPC[2] | Modifying Agent | Process Type | Millbase % Block Co-polymer[3] | % Modifier[3] | Viscosity Millbase at Shear Rate: | | | | Full Shade Coating Gloss 20° |
|---|---|---|---|---|---|---|---|---|---|---|---|---|
| | | | | | | | | 1 | 16 | 128 | 1024 | |
| 27 | without dispersant | — | — | — | — | — | — | 23200 | 3780 | 694 | 122 | 53 |
| 28[4] | P(BA-b-DMAEA) 76-24 | Polymer 4 | Mw= 11750/ Mn = 9037/PD = 1.3 | — | — | 20.0 | — | 13100 | 1980 | 341 | 72 | 65 |
| 29 | P(BA-b-DMAEA) 76-24 | Polymer 4 | Mw = 11750/Mn = 9037/PD = 1.3 | Acid 15 | β | 17.0 | 3.1 | 743 | 550 | 148 | 44 | 105 |
| 30 | P(BA-b-DMAEA) 76-24 | Polymer 4 | Mw = 11750/Mn = 9037/PD = 1.3 | Acid 15 | β | 15.9 | 4.3 | 860 | 506 | 141 | 43 | 106 |
| 31 | P(BA-b-DMAEA) 76-24 | Polymer 4 | Mw = 11750/Mn = 9037/PD = 1.3 | Acid 15 | β | 14.6 | 5.5 | 1590 | 642 | 152 | 44 | 107 |
| 32[4] | P(BA-b-DMAEA) 89-11 | Polymer 5 | | — | — | 20.0 | — | 14900 | 2220 | 391 | 84 | 62 |
| 33 | P(BA-b-DMAEA) 89-11 | Polymer 5 | | Acid 15 | β | 17.0 | 3.1 | 543 | 473 | 145 | 51 | 101 |
| 34 | P(BA-b-DMAEA) 89-11 | Polymer 5 | | Acid 15 | β | 16.4 | 3.6 | 427 | 266 | 115 | 41 | 104 |
| 35 | P(BA-b-DMAEA) 76-24 | Polymer 4 | Mw = 11750/Mn = 9037/PD = 1.3 | Acid 16 | β | 16.0 | 3.9 | 780 | 535 | 164 | 49 | 101 |
| 36 | P(BA-b-DMAEA) 76-24 | Polymer 4 | Mw = 11750/Mn = 9037/PD = 1.3 | Acid 16 | β | 15.0 | 5 | 693 | 378 | 138 | 45 | 98 |
| 37 | P(BA-b-DMAEA) 76-24 | Polymer 4 | Mw = 11750/Mn = 9037/PD = 1.3 | Acid 17 | β | 18.0 | 5 | 1070 | 400 | 123 | 43 | 94 |

[1]monomer composition given in wt %; BA = butyl acrylate, DMAEA = 2-dimethylaminoethyl acrylate
[2]molecular weights determined on the non modified block copolymers
[3]concentration of active block copolymer and modifier relative to the pigment
[4]Comparative Example

What is claimed is:

1. A composition comprising
 a) 0.1–99.9% by weight of a combination of dispersing agents consisting essentially of
 i) a block copolymer of the formula $$X-A_x-B_y-Y \quad (I),$$

wherein
 X and Y represent chain terminal groups from fragments of a polymerization initiator containing the group

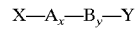

(A)

wherein
 X' is cleavable from the initiator as a free radical X. and is capable of initiating the polymerization of ethylenically unsaturated monomers; or
 one of X and Y represents the fragment of a free radical initiator and the other one represents the chain terminal group from the free nitroxyl radical

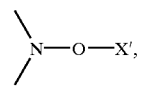

(B)

A and B represent different polymer blocks composed of non-ionic repeating units of ethylenically unsaturated monomers, wherein one of the polymer blocks A or B additionally contains repeating units of ethylenically unsaturated monomers substituted with ionic groups;
 x and y represent numerals greater than zero and define the number of monomer repeating units in polymer blocks A and B; and
 (ii) a salt forming component selected from the group consisting of mono-, bi- or tricyclic sulphonic, carboxylic or phosphonic acids, aliphatic sulphonic, carboxylic or phosphonic acids substituted with mono- bi- or tricyclic groups, alkyl halides substituted with mono-, bi- or tricyclic groups, and $C_1$–$C_4$alkyl esters of mono-, bi- or tricyclic sulphonic acids, wherein the mono-, bi-, or tricyclic groups present in the sulphonic, carboxylic and phosphonic acids or the mono, bi- or tricyclic substituents of the aliphatic sulfonic, carboxylic, phosphonic acids and alkyl halides are selected from the group consisting of saturated or unsaturated mono- or bi-, or tricycloaliphatic, heteromonocycloaliphatic or heterobicycloaliphatic, carbomonocyclic or carbobicyclic aromatic, partially saturated carbobicyclic aromatic, heteromonocyclic or heterobicyclic aromatic and partially saturated heterobicyclic aromatic groups, wherein component i) and ii) are different; and
 b) 0.1–99.9% by weight of dispersible inorganic or organic pigment particles.

2. A composition according to claim 1, wherein the polymerization initiator is represented by the formula

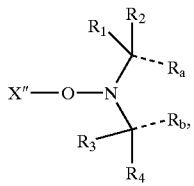 (II)

wherein

X" is cleavable from the compound (II) as a free radical X. and is capable of initiating the polymerization of ethylenically unsaturated monomers; or represents the fragment of a free radical initiator;

one of $R_1$ and $R_2$ represents $C_1$–$C_7$alkyl or hydroxy-$C_1$–$C_7$alkyl and the other one represents $C_1$–$C_4$alkyl, $C_1$–$C_4$alkyl substituted by $C_1$–$C_4$alkoxycarbonyl or $C_1$–$C_4$alkoxy or hydroxy-$C_1$–$C_4$alkyl; or $R_1$ and $R_2$ together with the adjacent C-atom both represent $C_3$–$C_7$cycloalkyl;

$R_3$ and $R_4$ are independently as defined as $R_1$ and $R_2$ or represent hydrogen;

$R_a$ represents hydrogen or a substituent selected from the group consisting of $C_1$–$C_4$alkyl, hydroxy-$C_1$–$C_4$alkyl, $C_5$–$C_{10}$aryl, $C_5$–$C_{10}$aryl-$C_1$–$C_4$alkyl, $C_1$–$C_4$alkyl-$C_5$–$C_{10}$aryl, cyano, $C_1$–$C_4$alkoxycarbonyl, $C_1$–$C_4$alkanoyloxy, $C_1$–$C_4$alkanoyloxy-$C_1$–$C_4$alkyl, carbamoyl, mono- or di- $C_1$–$C_4$alkylcarbamoyl, mono- or di-2-hydroxyethylcarbamoyl, amidino, 2imidazolyi, 1-hydroxy-2-hydroxymethyl-2-propylcarbamoyl, 1,1-dihydroxymethyl-2-hydroxycarbamoyl and —P=O (O—$C_1$–$C_4$alkyl)$_2$; and $R_b$ is as defined as $R_a$; or $R_a$ and $R_b$ together represent a divalent group and form a 5-, 6-, 7- or 8-membered aliphatic or aromatic heterocyclic group, which may contain 1–3 additional heteroatoms selected from the group consisting of nitrogen, oxygen and sulphur.

3. A composition according to claim 1, wherein one of the polymer blocks A and B is essentially composed of repeating units of ethylenically unsaturated monomers selected from the group consisting of styrenes, acrylic and $C_1$–$C_4$alkylacrylic acid-$C_1$–$C_{24}$alkyl esters, acrylic and $C_1$–$C_4$alkylacrylic acid-$C_6$–$C_{11}$aryl-$C_1$–$C_4$alkyl esters, acrylic and $C_1$–$C_4$alkylacrylic acid-$C_6$–$C_{11}$aryloxy-$C_1$–$C_4$alkyl esters, acrylic and $C_1$–$C_4$alkylacrylic acid-hydroxy-$C_2$–$C_6$alkyl esters, acrylic and $C_1$–$C_4$alkylacrylic acid-polyhydroxy-$C_3$–$C_6$alkyl esters, acrylic and $C_1$–$C_4$alkylacrylic acid-($C_1$–$C_4$alkyl)$_3$silyloxy-$C_2$–$C_4$alkyl esters; acrylic and $C_1$–$C_4$alkylacrylic acid-($C_1$–$C_4$alkyl)$_3$silyl-$C_1$–$C_4$alkyl esters, acrylic and $C_1$–$C_4$alkylacrylic acid-heterocyclyl-$C_2$–$C_4$alkyl esters; and acrylic and $C_1$–$C_4$alklacrylic acid esters having poly-$C_2$–$C_4$alkyleneglycolester groups, wherein the ester groups may be substituted with $C_1$–$C_{24}$alkoxy groups, acrylic and methacrylic acid amides, acrylic and $C_1$–$C_4$alkylacrylic acid-($C_1$–$C_4$alkyl)$_{1-2}$amides, acrylonitrile, esters of maleic acid or fumaric acid, or maleinimide and N-substituted maleinimides.

4. A composition according to claim 1, wherein one of the polymer blocks A and B is essentially composed of repeating units of ethylenically unsaturated monomers selected from the group consisting of styrenes, acrylic and methacrylic acid-$C_1$–$C_{24}$alkyl esters, acrylic and methacrylic acid-hydroxy-$C_2$–$C_6$alkyl esters, acrylic and methacrylic acid-dihydroxy-$C_3$–$C_4$alkyl esters and acrylic and methacrylic acid esters having poly-$C_2$–$C_4$alkyleneglycolester groups, wherein the ester groups may be substituted with $C_1$–$C_{24}$alkoxy groups.

5. A composition according to claim 1, wherein the repeating unit of an ethylenically unsaturated monomer substituted with an ionic group present in one of the polymer blocks A and B is represented by the cationic or anionic part of a salt formed from a compound of the formula

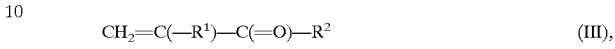 (III), wherein $R^1$ represents hydrogen or $C_1$–$C_4$alkyl; and $R^2$ represents —OH, $C_1$–$C_4$alkyl substituted by carboxy, sulpho or phosphono or amino substituted $C_2$–$C_{18}$alkoxy selected from the group consisting of amino-$C_2$–$C_{18}$alkoxy, $C_1$–$C_4$alkylamino-$C_2$–$C_{18}$alkoxy, di-$C_1$–$C_4$alkylamino-$C_2$–$C_{18}$alkoxy, hydroxy-$C_2$–$C_4$alkylamino-$C_2$–$C_{18}$alkoxy and $C_1$–$C_4$alkyl-(hydroxy-$C_2$–$C_4$alkyl)amino-$C_2$–$C_{18}$alkoxy.

6. A composition according to claim 1, wherein the repeating unit of an ethylenically unsaturated monomer substituted with an ionic group present in one of the polymer blocks A and B is represented by the cationic or anionic part of a salt formed from a compound of the formula (III), wherein $R^1$ represents hydrogen or methyl; and $R^2$ represents amino substituted $C_2$–$C_{18}$alkoxy selected from the group consisting of amino-$C_2$–$C_4$alkoxy, $C_1$–$C_4$alkylamino-$C_2$–$C_4$alkoxy, di-$C_1$–$C_4$alkylamino-$C_2$–$C_4$alkoxy, hydroxy-$C_2$–$C_4$alkylamino-$C_2$–$C_{18}$alkoxy and $C_1$–$C_4$alkyl-(hydroxy-$C_2$–$C_4$alkyl) amino-$C_2$–$C_4$alkoxy.

7. A composition according to claim 5, wherein the cationic part of a salt formed from a compound of the formula (III) is represented by an ester group of the formula

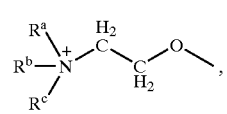 (C)

wherein one of $R^a$, $R^b$ and $R^c$ represents 2-hydroxyethyl and the other ones represent hydrogen, methyl or ethyl; or $R^a$, $R^b$ and $R^c$ independently of one another represent hydrogen or a substituent selected from the group consisting of $C_1$–$C_4$alkyl, aryl-$C_1$–$C_4$alkyl and ($C_1$–$C_4$alkyl)$_{1-3}$aryl.

8. A composition according to claim 1, wherein the repeating unit of an ethylenically unsaturated monomer is the acid addition salt or salt formed by quaternisation of an amino monomer selected from the group consisting of amino substituted styrene, ($C_1$–$C_4$alkyl)$_{1-2}$amino substituted styrene, N-mono-($C_1$–$C_4$alkyl)$_{1-2}$amino-$C_2$–$C_4$alkyl(meth) acrylamide and N,N-di-($C_1$–$C_4$alkyl)$_{1-2}$amino-$C_2$–$C_4$alkyl (meth)acrylamide, vinylpyridine or $C_1$–$C_4$alkyl substituted vinylpyridine, vinylimidazole and $C_1$–$C_4$alkyl substituted vinylimidazole.

9. A composition according to claim 5, wherein the repeating unit of an ethylenically unsaturated monomer substituted with an ionic group present in one of the polymer blocks A and B is represented by the cationic part of an acid addition salt or the salt formed by quaternisation of 4-aminostyrene, 4-dimethylaminostyrene, aminoalkyl (meth)acrylate selected from the group consisting of 2-dimethylaminoethyl acrylate (DMAEA), 2-dimethylaminoethyl methacrylate (DMAEMA), 2-diethylaminoethyl acrylate (DEAEA), 2-diethylaminoethyl methacrylate (DEAEMA), 2-t-butylaminoethyl acrylate (t-BAEA), 2-t-butylaminoethyl methacrylate (t-BAEMA), 3-dimethylaminopropylmethacrylamide, 4-vinylpyridine, 2-vinylpyridine and 1-vinylimidazole.

10. A composition according to claim 1, wherein the component (ii) forms a salt with the block copolymer (I) by acid-base reaction, acid addition or quaternisation reaction.

11. A composition according to claim 1, wherein a sulpho, carboxy or phosphono group, a sulphonic acid-$C_1$–$C_4$alkyl ester group or an alkyl halide group, which is present in the salt forming component (ii), forms a salt by reaction with a free amino group or a primary, secondary or tertiary amino group which is present in one of the polymer blocks A and B of the block copolymer component (I).

12. A composition according to claim 1, wherein the dispersible organic pigment particles of component b) are selected from the group consisting of azo, disazo, naphthol, benzimidazolone, azocondensation, metal complex, isoindolinone, isoindoline, chinophthalon, dioxazine indigo, thioindigo, quinacridones, phthalocyanines, perylenes, perionones, anthraquinones, anthrapyrimidines, indanthrones, flavanthrones, pyranthrones, antanthrones, isoviolanthrones, diketoypyrrolopyrrole, and carbazoles.

13. A composition according to claim 1, wherein the dispersible inorganic pigment particles of component b) are selected from the group consisting of aluminium, aluminium oxide, and silicates, iron(III)oxide, chromium(III)oxide, titanium(IV)oxide, zirconium(IV)oxide, zinc oxide, zinc sulphide, zinc phosphate, mixed metal oxide phosphates, molybdenum sulphide, cadmium sulphide, carbon black or graphite, vanadates, chromates, and molybdates, and mixtures, crystal forms or modifications thereof.

14. A composition according to claim 1, which additionally contains binding agents and conventional additives.

15. A composition according to claim 13, wherein the conventional additives are selected from the group consisting of surfactants, stabilisers, UV-absorbers, HALS-stabilisers, anti-foaming agents, antioxidants, dyes, plasticisers, thixotropic agents, drying catalysts, anti-skinning agents and levelling agents.

16. A composition according to claim 1 comprising
a) 0.1–99.9% by weight of a combination of dispersing agents consisting essentially of
i) a block copolymer of the formula

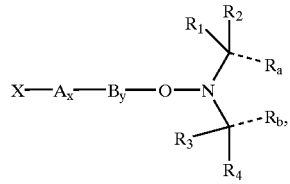

(I')

wherein
X represents a chain terminal group;
A and B represent different polymer blocks composed of non-ionic repeating units of ethylenically unsaturated monomers selected from the group consisting of styrenes, acrylic and methacrylic acid-$C_1$–$C_{24}$alkyl esters, acrylic and methacrylic acid-hydroxy-$C_2$–$C_6$alkyl esters, acrylic and methacrylic acid-dihydroxy-$C_3$–$C_4$alkyl esters and acrylic and methacrylic acid esters having poly-$C_2$–$C_4$alkyleneglycolester groups, wherein the ester groups may be substituted with $C_1$–$C_{24}$alkoxy groups; and wherein the repeating unit of an ethylenically unsaturated monomer substituted with an ionic group present in one of the polymer blocks A and B is represented by the cationic or anionic part of a salt formed from a compound of the formula $$CH_2=C(R^1)-(C=O)-R^2 \quad (III),$$

wherein
$R^1$ represents hydrogen or $C_1$–$C_4$alkyl; and
$R^2$ represents —OH, $C_1$–$C_4$alkyl substituted by carboxy, sulpho or phosphono or amino substituted $C_2$–$C_{18}$alkoxy selected from the group consisting of amino-$C_2$–$C_{18}$alkoxy, $C_1$–$C_4$alkylamino-$C_2$–$C_{18}$alkoxy, di-$C_1$–$C_4$alkylamino-$C_2$–$C_{18}$alkoxy, hydroxy-$C_2$–$C_4$alkylamino-$C_2$–$C_{18}$alkoxy and $C_1$–$C_4$alkyl-(hydroxy-$C_2$–$C_4$alkyl)-amino-$C_2$–$C_{18}$alkoxy; or wherein the repeating unit of an ethylenically unsaturated monomer substituted with an ionic group present in one of the polymer blocks A and B is the acid addition salt of an amino monomer selected from the group consisting of amino substituted styrene, $(C_1$–$C_4$alkyl$)_{1-2}$amino substituted styrene, N-mono-$(C_1$–$C_4$alkyl$)_{1-2}$amino-$C_2$–$C_4$alkyl (meth)acrylamide and N,N-di-$(C_1$–$C_4$alkyl$)_{1-2}$amino-$C_2$–$C_4$alkyl(meth)acrylamide;

x and y represent numerals greater than zero and define the number of monomer repeating units in polymer blocks A and B;

one of $R_1$ and $R_2$ represents $C_1$–$C_7$alkyl or hydroxy-$C_1$–$C_7$alkyl and the other one represents $C_1$–$C_4$alkyl or $C_1$–$C_4$alkyl substituted by $C_1$–$C_4$alkoxycarbonyl or $C_1$–$C_4$alkoxy or hydroxy-$C_1$–$C_7$alkyl; or $R_1$ and $R_2$ together with the adjacent C-atom both represent $C_3$–$C_7$cycloalkyl;

$R_3$ and $R_4$ are independently as defined as $R_1$ and $R_2$ or —H;

$R_a$ represents hydrogen or a substituent selected from the group consisting of $C_1$–$C_4$alkyl, hydroxy-$C_1$–$C_4$alkyl, $C_5$–$C_{10}$aryl, $C_5$–$C_{10}$aryl-$C_1$–$C_4$alkyl, $C_1$–$C_4$alkyl-$C_5$–$C_{10}$aryl, cyano, $C_1$–$C_4$alkoxycarbonyl, $C_1$–$C_4$alkanoyloxy, $C_1$–$C_4$alkanoyloxy-$C_1$–$C_4$alkyl, carbamoyl, mono- or di- $C_1$–$C_4$alkylcarbamoyl, mono- or di-2-hydroxyethylcarbamoyl, amidino, 2-imidazolyl, 1-hydroxy-2-hydroxymethyl-2-propylcarbamoyl, 1,1-dihydroxymethyl-2-hydroxycarbamoyl and —P=O(O—$C_1$–$C_4$alkyl$)_2$; and $R_b$ is as defined as $R_a$; or $R_a$ and $R_b$ together represent a divalent group and form a 5-, 6-, 7- or 8-membered aliphatic or aromatic heterocyclic group, which may contain 1–3 additional heteroatoms selected from the group consisting of nitrogen, oxygen and sulphur; and (ii) a salt forming component according to claim 1; and b) 0.1–99.9% by weight of dispersible inorganic or organic pigment particles.

17. A composition according to claim 1 comprising
a) 0.1–99.9% by weight of a combination of dispersing agents consisting essentially of
i) a block copolymer of the formula (I'),

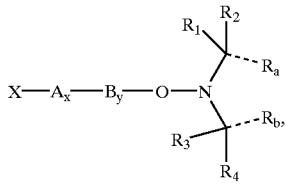

(I')

wherein
X represents a chain terminal fragment;
one of the polymer blocks A and B is essentially composed of repeating units of ethylenically unsaturated monomers selected from the group consisting of styrenes, acrylic and methacrylic acid-$C_1$–$C_{24}$alkyl esters, acrylic and methacrylic acid-hydroxy-$C_2$–$C_6$alkyl esters, acrylic and methacrylic acid-dihydroxy-$C_3$–$C_4$alkyl esters, and acrylic and methacrylic acid esters having poly-$C_2$–$C_4$alkyleneglycolester groups, wherein the ester groups may be substituted with $C_1$–$C_{24}$alkoxy groups; and
wherein the repeating unit of an ethylenically unsaturated monomer substituted with an ionic group present in one of the polymer blocks A and B is represented by the cationic part of an acid addition salt or a salt formed by quaternisation of 4-aminostyrene, 4-dimethylaminostyrene or aminoalkyl acrylate or methacrylate selected from the group consisting of 2-dimethylaminoethyl acrylate (DMAEA), 2-dimethylaminoethyl methacrylate (DMAEMA), 2-diethylaminoethyl acrylate (DEAEA), 2-diethylaminoethyl methacrylate (DEAEMA), 2-t-butylaminoethyl acrylate (t-BAEA), 2-t-butylaminoethyl methacrylate (t-BAEMA), 3-dimethylaminopropylmethacrylamide, 4-vinylpyridine, 2-vinylpyridine, and 1-vinylimidazole;
x and y represent numerals greater than zero and define the number of monomer repeating units in polymer blocks A and B;
one of $R_1$ and $R_2$ represents methyl and the other one represents methyl or ethyl and one of $R_3$ and $R_4$ represents methyl and the other one represents methyl or ethyl;

and $R_a$ and $R_b$ together represent a group of the partial formula

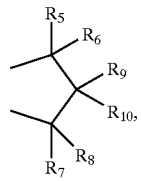

(D)

wherein
$R_5$, $R_6$, $R_7$ and $R_8$ independently of one another represent hydrogen, methyl or ethyl; and
one of $R_9$ and $R_{10}$ independently of the other represents hydrogen or substituents or $R_9$ and $R_{10}$ both represent substituents; and
(ii) a salt forming component according to claim 1; and
b) 0.1–99.9% by weight of dispersible inorganic or organic pigment particles.

18. A composition according to claim 17 wherein the composition is a coating and is a print, image, ink or lacquers.

19. A pigment dispersion comprising a dispersed phase consisting of
a') A block copolymer of formula (I) and a salt forming component (ii), as defined in claim 1;
b') Dispersed pigment particles; and an organic or aqueous carrier liquid.

20. A process for preparing a composition according to claim 1, which comprises preparing the block copolymer (I) by copolymerising the fragments A and B by free radical polymerisation and
α) modifying the block copolymer with the salt forming component, isolating and adding the modified block copolymer to dispersible pigment particles and optionally binder materials, fillers or other conventional additives; or
β) modifying the block copolymer with the salt forming component in the presence of dispersible pigment particles and optionally binder materials, fillers or other conventional additives.

* * * * *